United States Patent
Luo et al.

(10) Patent No.: US 12,368,655 B2
(45) Date of Patent: Jul. 22, 2025

(54) SERVICE RESOURCE PRECONFIGURATION METHOD AND DEVICE, AND SYSTEM

(71) Applicant: HUAWEI TECHNOLOGIES CO., LTD., Guangdong (CN)

(72) Inventors: Xiaolin Luo, Wuhan (CN); Haomian Zheng, Dongguan (CN); Gang Xie, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 319 days.

(21) Appl. No.: 17/991,996

(22) Filed: Nov. 22, 2022

(65) Prior Publication Data
US 2023/0078178 A1   Mar. 16, 2023

Related U.S. Application Data

(63) Continuation of application No. PCT/CN2020/140217, filed on Dec. 28, 2020.

(30) Foreign Application Priority Data

May 26, 2020   (CN) ......................... 202010457977.1

(51) Int. Cl.
  *H04L 41/00*   (2022.01)
  *H04B 10/032*   (2013.01)
  *H04L 41/5054*   (2022.01)
  *H04L 45/00*   (2022.01)
  *H04Q 11/00*   (2006.01)

(52) U.S. Cl.
  CPC ....... *H04L 41/5054* (2013.01); *H04B 10/032* (2013.01); *H04L 41/00* (2013.01); *H04L 45/22* (2013.01); *H04Q 11/0067* (2013.01); *H04Q 2011/0081* (2013.01)

(58) Field of Classification Search
  CPC ....... H04J 2203/006; H04J 3/14; H04L 45/22; H04L 45/28; H04L 41/0663; H04L 45/00
  See application file for complete search history.

(56) References Cited

U.S. PATENT DOCUMENTS

| | | | | |
|---|---|---|---|---|
| 8,593,940 B2 * | 11/2013 | Zeng | ..................... | H04J 3/1652 370/216 |
| 9,172,658 B2 * | 10/2015 | Kakkar | ................. | H04L 47/728 |
| 9,667,341 B2 * | 5/2017 | Youn | ..................... | H04J 3/1652 |
| 9,800,325 B1 * | 10/2017 | Skalecki | ............. | H04B 10/032 |
| 10,993,005 B2 * | 4/2021 | Zheng | .................. | H04J 3/1652 |

(Continued)

FOREIGN PATENT DOCUMENTS

| | | |
|---|---|---|
| CN | 1606277 A | 4/2005 |
| CN | 1859156 A | 11/2006 |

(Continued)

*Primary Examiner* — Tanya T Motsinger

(57) ABSTRACT

Embodiments of this application disclose a service resource preconfiguration method and device, and a system. The method includes establishing a first working path, sending a first path message from a first node to a second node, the first path message including an instruction to the second node to preconfigure a second channel resource; and preconfiguring the second channel resource based on the first path message. Fast automatic service recovery can be implemented, and fault recovery performance can be improved.

26 Claims, 13 Drawing Sheets

(56) References Cited

U.S. PATENT DOCUMENTS

| | | | |
|---|---|---|---|
| 12,245,084 B2* | 3/2025 | Yu | H04W 72/20 |
| 2007/0070909 A1 | 3/2007 | Reeve | |
| 2007/0292129 A1* | 12/2007 | Yan | H04B 10/032 |
| | | | 398/5 |
| 2010/0296809 A1* | 11/2010 | Yan | H04J 3/14 |
| | | | 398/45 |
| 2012/0250695 A1* | 10/2012 | Jia | H04L 41/0886 |
| | | | 370/400 |
| 2013/0243417 A1* | 9/2013 | Youn | H04J 14/0295 |
| | | | 398/5 |
| 2014/0029416 A1* | 1/2014 | Ceccarelli | H04L 45/22 |
| | | | 370/225 |
| 2014/0233939 A1* | 8/2014 | Gruman | H04Q 11/0062 |
| | | | 398/5 |
| 2014/0281670 A1* | 9/2014 | Vasseur | H04L 45/04 |
| | | | 714/4.11 |
| 2014/0362684 A1* | 12/2014 | Green | H04L 45/28 |
| | | | 370/225 |
| 2015/0186216 A1* | 7/2015 | Lee | H04L 45/28 |
| | | | 714/4.2 |
| 2015/0188625 A1* | 7/2015 | Park | H04Q 11/0062 |
| | | | 398/2 |
| 2015/0215200 A1* | 7/2015 | Bottari | H04L 45/50 |
| | | | 370/228 |
| 2015/0229398 A1 | 8/2015 | Lee et al. | |
| 2016/0149752 A1* | 5/2016 | Belanger | H04L 41/0659 |
| | | | 370/216 |
| 2016/0149802 A1* | 5/2016 | Youn | H04L 45/28 |
| | | | 398/45 |
| 2016/0344471 A1* | 11/2016 | Meng | H04L 41/0895 |
| 2017/0317953 A1* | 11/2017 | Sareen | H04L 49/25 |
| 2017/0366255 A1* | 12/2017 | Sharma | H04B 10/032 |
| 2018/0331974 A1* | 11/2018 | He | H04L 47/20 |
| 2019/0215060 A1* | 7/2019 | Zheng | H04J 3/14 |
| 2020/0389386 A1* | 12/2020 | Uscumlic | H04L 49/90 |
| 2021/0377160 A1* | 12/2021 | K | H04L 45/64 |
| 2023/0078178 A1* | 3/2023 | Luo | H04L 41/00 |
| | | | 398/5 |
| 2024/0064111 A1* | 2/2024 | Li | H04J 3/14 |

FOREIGN PATENT DOCUMENTS

| | | |
|---|---|---|
| CN | 1921409 A | 2/2007 |
| CN | 101160901 A | 4/2008 |
| CN | 101958809 A | 1/2011 |
| CN | 101969381 A | 2/2011 |
| CN | 102104495 A | 6/2011 |
| CN | 105721045 A | 6/2016 |
| CN | 106487674 A | 3/2017 |
| WO | 2007071189 A1 | 6/2007 |
| WO | 2015024163 A1 | 2/2015 |

* cited by examiner

SERVICE RESOURCE PRECONFIGURATION METHOD AND DEVICE, AND SYSTEM

CROSS-REFERENCE TO RELATED APPLICATIONS

This application is a continuation of International Application No. PCT/CN2020/140217 filed on Dec. 28, 2020, which claims priority to Chinese Patent Application No. 202010457977.1 filed on May 26, 2020. The disclosures of the aforementioned applications are hereby incorporated by reference in their entireties.

TECHNICAL FIELD

This disclosure relates to optical communication technologies, and in particular, to a service resource preconfiguration method, device and system.

BACKGROUND

An automatically switched optical network (ASON) is a new type of network that completes automatic optical network connection switching in an optical transport network (OTN) or a synchronous digital hierarchy (SDH) transport network under control of an ASON signaling network. A basic idea of the ASON is introducing a control plane into the optical transport network or the SDH transport network to implement real-time on-demand network resource allocation, thereby realizing an intelligent optical network. The ASON basically covers metropolitan area and core backbone WDM networks. After a fiber cut occurs in a network, an end-to-end recovery path may be automatically established by using resource reservation protocol-traffic engineering (RSVP-TE) of a generalized multiprotocol label switching (GMPLS) protocol, to provide a service with a real-time rerouting protection recovery capability.

The ASON can provide fast end-to-end establishment, query, deletion, attribute modification, and recovery functions of a service by using the RSVP-TE protocol. A network management system delivers a service creation command to a source node network element, and then the source node network element implements route computation and initiates a service configuration process by using the RSVP-TE signaling protocol to establish a cross-connection node-by-node from the source node to downstream nodes, thereby completing service creation. After a fiber fault (for example, a fiber cut fault) occurs in a network, the source node can perceive (detect) the fault and trigger nodes of a recovery path to complete cross-connection configuration hop-by-hop to implement end-to-end recovery path establishment. After the establishment is completed, a service is automatically recovered.

However, after the fiber fault occurs in the network, the nodes need to be triggered, hop-by-hop along the recovery path by using the RSVP-TE signaling protocol to complete the cross-connection configuration. This cross-connection configuration consumes much time and is serially completed by the nodes, resulting in low fault recovery performance.

SUMMARY

Embodiments of this disclosure provide a service resource preconfiguration method and device, and a system, to improve fault recovery performance.

According to a first aspect, an embodiment of this disclosure provides a service resource preconfiguration method. The method is used in a communication system, the communication system includes a first working path and a preset recovery path, the preset recovery path includes a first node and a second node, and the method may include: after establishment of the first working path is completed, the first node sends a first path message to the second node, where the first path message indicates the second node to preconfigure a second channel resource, and the first working path is used to transmit a first service flow; and the second node preconfigures the second channel resource based on the first path message, where the second channel resource is used to establish the preset recovery path, and the second channel resource is shared in the communication system.

In this implementation, channel resource configuration of the second node of the preset recovery path is completed before a fault occurs, thereby saving time for configuring the channel resource by the node in a fault recovery process. Therefore, when the first working path is faulty, the first working path can be fast switched to the preset recovery path to continue to transmit the first service flow, to implement fast automatic service recovery and improve fault recovery performance.

In a possible design, the first path message includes resource sharing identification information, and the resource sharing identification information indicates that the second channel resource is shared in the communication system.

In this implementation, the resource sharing identification information is carried in the first path message, to indicate that the second channel resource preconfigured by the second node can be shared in a network, in other words, the second channel resource preconfigured by the second node can be used to transmit not only the first service flow but also another service flow, thereby improving channel resource utilization.

In a possible design, before that the first node sends a first path message to the second node, the method further includes: the first node computes the preset recovery path of the first working path, and generates the first path message.

In a possible design, after establishment of the first working path is completed, the method further includes: the first node preconfigures a first channel resource, where the first channel resource is shared in the communication system.

In this implementation, the first channel resource is shared in the network, so that the first channel resource preconfigured by the first node can be used to transmit not only the first service flow but also another service flow, thereby improving channel resource utilization.

In a possible design, the preset recovery path further includes a third node, the first path message further includes channel resource configuration information of the third node, and the channel resource configuration information indicates the third node to preconfigure a third channel resource.

In a possible design, the first channel resource is a first optical channel data unit-k ODUk reserved by the first node, and the second channel resource is a second optical channel data unit-k ODUk reserved by the second node.

In a possible design, the first path message includes at least one of the following information: line board identification information, port identification information, and channel resource information of the second node, where the line board identification information is used to configure a line board on which the second optical channel data unit-k ODUk reserved by the second node is located, the port identification information is used to configure a port on which the second optical channel data unit-k ODUk reserved by the second node is located, the channel resource information is used to identify the second optical channel data unit-k ODUk reserved by the second node, and the second optical channel data unit-k ODUk reserved by the second node is used to establish the preset recovery path.

In this implementation, the line board identification information, the port identification information, and the channel resource information of the second node are preconfigured by using the first path message, so that pre-allocation of the line board ODUk of the second node of the preset recovery path is completed before a fault occurs, thereby saving time for configuring the line board ODUk by the node in a fault recovery process. Therefore, when the first working path is faulty, the first working path can be fast switched to the preset recovery path to continue to transmit the first service flow, to implement fast automatic service recovery and improve fault recovery performance.

In a possible design, the channel resource information includes channel identification information and a slot quantity, the channel identification information indicates a channel of the second optical channel data unit-k ODUk reserved by the second node, and the slot quantity indicates a slot quantity of the second optical channel data unit-k ODUk reserved by the second node.

In a possible design, the first path message further includes service identification information, and the service identification information is used to configure a service on which fault recovery is performed on the preset recovery path.

In a possible design, the first path message further includes a channel resource configuration type, and the channel resource configuration type indicates a service-level agreement SLA type supported by the second optical channel data unit-k ODUk reserved by the second node.

In this implementation, the channel resource configuration type is carried in the first path message, to indicate that the channel resource preconfigured by the second node can be shared with another service flow of the channel resource configuration type. During service fault recovery, another service flow of the channel resource configuration type is allowed to use the second channel resource, to implement sharing of the channel resource for a specified service type.

In a possible design, the first path message is a message that is based on resource reservation protocol-traffic engineering RSVP-TE.

According to a second aspect, an embodiment provides a service resource preconfiguration method. The method may include: after establishment of a working path is completed, a second node receives a first path message sent by a first node, where the first path message indicates the second node to preconfigure a first channel resource, a preset recovery path includes the first node and the second node, and the working path is used to transmit a service flow; and the second node preconfigures the first channel resource based on the first path message, where the first channel resource is used to establish the preset recovery path after the working path is faulty, to transmit the service flow.

In a possible design, the first path message includes resource sharing identification information, and the resource sharing identification information indicates that the first channel resource is shared in a communication system.

In a possible design, the preset recovery path further includes a third node, the first path message further includes channel resource configuration information of the third node, and the channel resource configuration information indicates the third node to preconfigure a second channel resource; and the method may further include: the second node sends a second path message to the third node, where the second path message carries the channel resource configuration information of the third node.

In a possible design, the first channel resource is a first optical channel data unit-k ODUk reserved by the second node, and the second channel resource is a second optical channel data unit-k ODUk reserved by the third node.

In a possible design, the first path message includes at least one of the following information: line board identification information, port identification information, and channel resource information of the second node, where the line board identification information is used to configure a line board on which the first optical channel data unit-k ODUk reserved by the second node is located, the port identification information is used to configure a port on which the first optical channel data unit-k ODUk reserved by the second node is located, the channel resource information is used to identify the first optical channel data unit-k ODUk reserved by the second node, and the first optical channel data unit-k ODUk reserved by the second node is used to establish the preset recovery path.

In a possible design, the first path message further includes service identification information, and the service identification information is used to configure a service on which fault recovery is performed on the preset recovery path.

In a possible design, the first path message further includes a channel resource configuration type, and the channel resource configuration type indicates a service-level agreement SLA type supported by the first optical channel data unit-k ODUk reserved by the second node.

According to a third aspect, an embodiment provides a service resource preconfiguration method. The method may include: after establishment of a working path is completed, a network device determines a preset recovery path of the working path; and the network device sends a first message to at least one node of the preset recovery path, where the first message indicates the at least one node of the preset recovery path to preconfigure a channel resource. The channel resource is used for service fault recovery.

In a possible design, the first message includes resource sharing identification information, and the resource sharing identification information indicates that the channel resource is allowed to be shared by a plurality of services.

In a possible design, the first message includes at least one of the following information: line board identification information, port identification information, and channel resource information of the at least one node, where the line board identification information is used to configure a line board on which an optical channel data unit-k ODUk reserved by the at least one node is located, the port identification information is used to configure a port on which the optical channel data unit-k ODUk reserved by the at least one node is located, the channel resource information is used to identify the optical channel data unit-k ODUk reserved by the at least one node, and the optical channel data unit-k ODUk reserved by the at least one node is used to establish the preset recovery path.

In a possible design, the channel resource information includes channel identification information and a slot quantity, the channel identification information indicates a channel of the optical channel data unit-k ODUk reserved by the at least one node, and the slot quantity indicates a slot quantity of the optical channel data unit-k ODUk reserved by the at least one node.

In a possible design, the first message further includes service identification information, and the service identification information is used to configure a service on which service fault recovery is performed on the preset recovery path.

In a possible design, the first message further includes a channel resource configuration type, and the channel resource configuration type indicates a service-level agreement SLA type supported by the optical channel data unit-k ODUk reserved by the at least one node.

In a possible design, the first message is a message that is based on a path computation element communication protocol PCEP.

According to a fourth aspect, an embodiment provides a service resource preconfiguration method. The method may include: a network slice manager separately sends first messages to a plurality of nodes of a network slice, where the first messages indicate the nodes of the network slice to preconfigure channel resources. The channel resources are used to establish a service path.

In a possible design, the first message includes resource sharing identification information, and the resource sharing identification information indicates that the channel resource is allowed to be shared by a plurality of services.

In a possible design, the first message includes at least one of the following information: line board identification information, port identification information, and channel resource information of the node, where the line board identification information is used to configure a line board on which an optical channel data unit-k ODUk reserved by the node is located, the port identification information is used to configure a port on which the optical channel data unit-k ODUk reserved by the node is located, the channel resource information is used to identify the optical channel data unit-k ODUk reserved by the node, and the optical channel data unit-k ODUk reserved by the node is used to establish the service path.

In a possible design, the channel resource information includes channel identification information and a slot quantity, the channel identification information indicates a channel of the optical channel data unit-k ODUk reserved by the node, and the slot quantity indicates a slot quantity of the optical channel data unit-k ODUk reserved by the node.

In a possible design, the first message further includes a channel resource configuration type, and the channel resource configuration type indicates a service-level agreement SLA type supported by the optical channel data unit-k ODUk reserved by the node.

In a possible design, the first message is a network slice establishment message or a network slice update message.

According to a fifth aspect, this disclosure provides a service resource preconfiguration apparatus. The service resource preconfiguration apparatus may be a node or a chip or a system-on-a-chip in the node, or may be a functional module that is in the node and that is configured to implement any one of the second aspect or the possible designs of the second aspect. The service resource preconfiguration apparatus may implement the function executed by the second node in the second aspect or each possible design of the second aspect, and the function may be implemented by hardware by executing corresponding software. The hardware or the software includes one or more modules corresponding to the function. For example, in a possible implementation, the service resource preconfiguration apparatus may include a transceiver module and a processing module.

According to a sixth aspect, this disclosure provides a service resource preconfiguration apparatus. The service resource preconfiguration apparatus may be a network device or a chip or a system-on-a-chip in the network device, or may be a functional module that is in the network device and that is configured to implement any one of the third aspect or the possible designs of the third aspect. The service resource preconfiguration apparatus may implement the function executed by the network device in the third aspect or each possible design of the third aspect, and the function may be implemented by hardware by executing corresponding software. The hardware or the software includes one or more modules corresponding to the function. For example, in a possible implementation, the service resource preconfiguration apparatus may include a transceiver module and a processing module.

According to a seventh aspect, this disclosure provides a service resource preconfiguration apparatus. The service resource preconfiguration apparatus may be a network slice manager or a chip or a system-on-a-chip in the network slice manager, or may be a functional module that is in the network slice manager and that is configured to implement any one of the fourth aspect or the possible designs of the fourth aspect. The service resource preconfiguration apparatus may implement the function executed by the network slice manager in the fourth aspect or each possible design of the fourth aspect, and the function may be implemented by hardware by executing corresponding software. The hardware or the software includes one or more modules corresponding to the function. For example, in a possible implementation, the service resource preconfiguration apparatus may include a transceiver module and a processing module.

According to an eighth aspect, an embodiment provides a service resource preconfiguration apparatus, including: one or more processors; and a memory, configured to store one or more programs. When the one or more programs are executed by the one or more processors, the one or more processors are enabled to implement the method according to any one of the second aspect or the possible designs of the second aspect, or the one or more processors are enabled to implement the method according to any one of the third aspect or the possible designs of the third aspect, or the one or more processors are enabled to implement the method according to any one of the fourth aspect or the possible designs of the fourth aspect.

According to a ninth aspect, an embodiment provides a computer-readable storage medium, including a computer program. When the computer program is executed in a computer, the computer is enabled to perform the method in any one of the first aspect or the possible designs of the first aspect, perform the method in any one of the second aspect or the possible designs of the second aspect, perform the method in any one of the third aspect or the possible designs of the third aspect, or perform the method in any one of the fourth aspect or the possible designs of the fourth aspect.

According to a tenth aspect, an embodiment provides a computer program product, including a computer program. When the computer program is executed in a computer, the computer is enabled to perform the method in any one of the first aspect or the possible designs of the first aspect, perform the method in any one of the second aspect or the possible designs of the second aspect, perform the method in any one of the third aspect or the possible designs of the third aspect, or perform the method in any one of the fourth aspect or the possible designs of the fourth aspect.

According to an eleventh aspect, an embodiment provides a communication system. The communication system includes a first node and a second node. The second node is configured to perform the method according to any one of the second aspect or the possible designs of the second aspect.

It should be understood that technical solutions in the second to the eleventh aspects of this disclosure are consistent with those in the first aspect, and beneficial effects achieved by these aspects and corresponding feasible implementations are similar. Details are not described again.

Therefore, it can be learned that, in the embodiments of this disclosure, after establishment of the first working path is completed, the first node sends the first path message to the second node, where the first path message indicates the second node to preconfigure the second channel resource; and the second node preconfigures the second channel resource based on the first path message. Channel resource configuration of the second node of the preset recovery path is completed before a fault occurs, thereby saving time for configuring the channel resource by the node in a fault recovery process. Therefore, when the first working path is faulty, the first working path can be fast switched to the preset recovery path to continue to transmit the first service flow, to implement fast automatic service recovery and improve fault recovery performance.

DESCRIPTION OF EMBODIMENTS

In solutions provided in embodiments of this disclosure, channel resources, for example, line board optical channel data unit-k (ODUk) slot mapping, of nodes of a preset recovery path are preconfigured, so that a cross-connection of the nodes of the recovery path can be fast established when a working path is faulty, to fast recover a service. Because the channel resources are preconfigured, duration consumed by cross-connection configuration of the nodes in a fault recovery process can be reduced, thereby improving service recovery performance. For specific implementations thereof, refer to specific explanations in the following embodiments.

First, some terms in the embodiments of this application are explained, to help understand a service resource preconfiguration method in the embodiments of this application.

ASON: The ASON includes three parts: a transport plane, a control plane, and a management plane. The transport plane includes transport network elements, and the transport network elements are physical planes for implementing switching, connection establishment/breaking, and transport functions. The introduction of the control plane is a fundamental point that distinguishes the ASON from a conventional optical transport network. The control plane includes a series of signaling and protocols for real-time control, so that the ASON has functions of connection establishment/breaking control, monitoring, maintenance, and the like. It can be learned that the control plane works under the support of a signaling network; and can control an OTN (optical transport network) or an SDH transport network by using the transport plane. The service resource preconfiguration method in the embodiments of this application is described by using the OTN as an example, and a protection scope thereof is not limited thereto.

Figure 1:
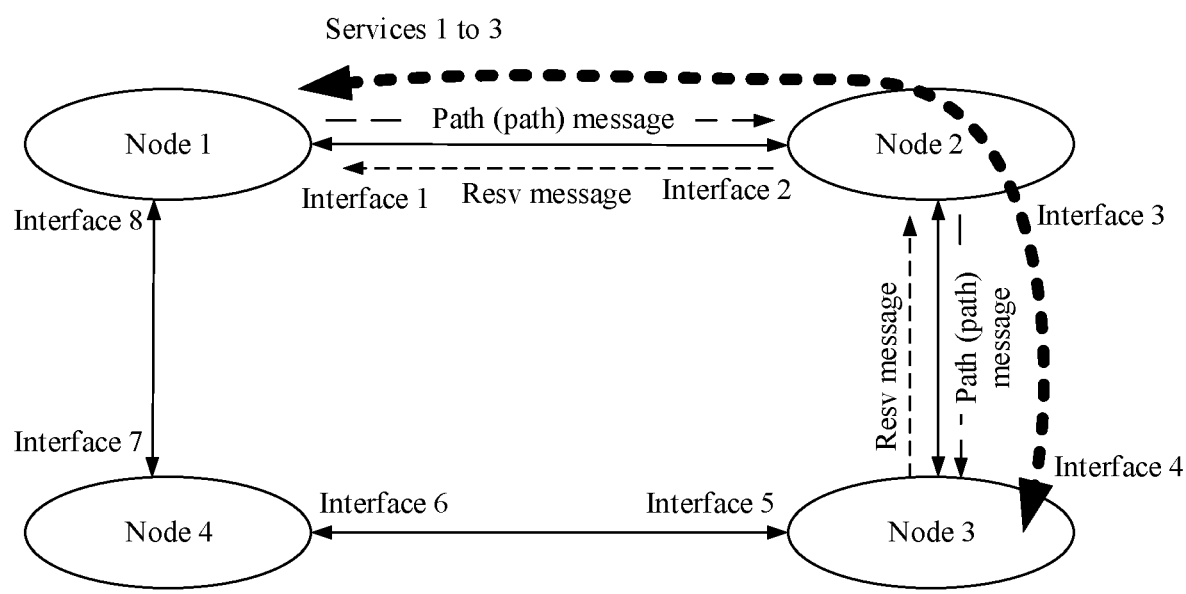
FIG. 1 is a schematic diagram of a control plane of an ASON according to an embodiment of this disclosure.

Node: The node indicates an independent hardware entity, namely, an optical transport network (OTN) device, in a network (for example, an ASON in the embodiments of this disclosure). For example, the ASON includes four OTN devices. FIG. 1 is a schematic diagram of a control plane of an ASON according to an embodiment of this application. As shown in FIG. 1, each OTN device may be used as one node, that is, four nodes are shown in FIG. 1: a node 1, a node 2, a node 3, and a node 4. In this embodiment of this application, service resource preconfiguration is implemented based on the control plane of the ASON, and the control plane of the ASON is in a one-to-one correspondence with a transport plane. For example, in the control plane, the four nodes may implement service resource preconfiguration by using messages such as path messages and Resv messages. The nodes complete the service resource preconfiguration based on the messages in the control plane, to control resource reservation of the OTN devices.

Port (may also be referred to as an interface): The port is a physical port that is in a node and that is configured to send and/or receive network protocol messages and traffic data. For example, in FIG. 1, there are eight interfaces: an interface 1, an interface 2, an interface 3, an interface 4, an interface 5, an interface 6, an interface 7, and an interface 8.

Link: The link indicates a connection relationship between two nodes. The link is indicated by a (node-interface) pair, to indicate whether a protocol message and traffic data can be forwarded between the two nodes. For example, as shown in FIG. 1, a link (node 1-interface 1, node 2-interface 2) indicates that a protocol message and traffic data can be sent from the interface 1 of the node 1 and received by the interface 2 of the node 2. The ASON shown in FIG. 1 has eight links: a link 1-2 ((node 1-interface 1)→(node 2-interface 2)), a link 1-4 ((node 1-interface 8)→(node 4-interface 7)), a link 2-1 ((node 2-interface 2)→(node 1-interface 1)), a link 2-3 ((node 2-interface 3)→(node 3-interface 4)), a link 3-2 ((node 3-interface 4)→(node 2-interface 3)), a link 3-4 ((node 3-interface 5)→(node 4-interface 6)), a link 4-3 ((node 4-interface 6)→(node 3-interface 5)), and a link 4-1 ((node 4-interface 7)→(node 1-interface 8)).

Service path: The service path indicates that a physical channel connection between two nodes is established, and data traffic can be sent from a source node and received by a sink node. For example, in FIG. 1, there is a service path 1-3, indicating that there is a connectable data channel between the node 1 and the node 3. The service path may be used as a working path or a recovery path.

The following describes an application scenario of the embodiments of this disclosure by using an example.

Figure 2:
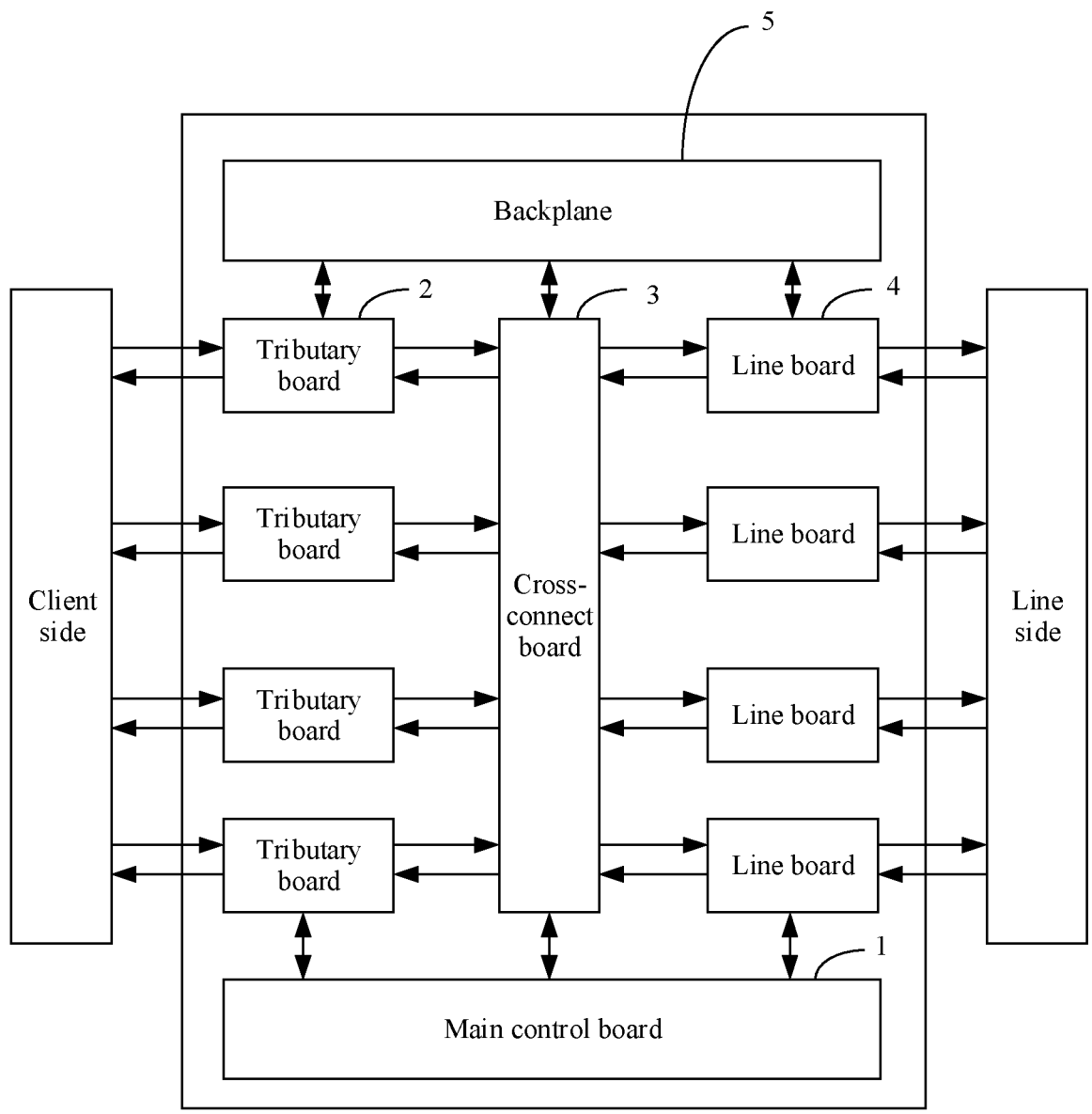
FIG. 2 is a schematic diagram of a hardware structure of an OTN device according to an embodiment of this disclosure.

FIG. 2 is a schematic diagram of a hardware structure of an OTN device according to an embodiment of this disclosure. The OTN device may be a node in an ASON, for example, any node of a working path or a recovery path. As shown in FIG. 2, the OTN device may include a main control board 1, tributary boards 2, a cross-connect board 3, line boards 4, and a backplane 5. A service transmission direction may be from a client side to a line side, or may be from a line side to a client side. A service sent or received by the client side is referred to as a client-side service, and a service received or sent by the line side is referred to as a WDM-side service. Service processing procedures in the two directions are mutually reverse processes, and this embodiment provides descriptions by using the direction from the client side to the line side as an example.

The main control board 1 and the backplane 5 are separately connected to the tributary boards 2, the cross-connect board 3, and the line boards 4 directly or by using a bus, to perform control and management functions on the tributary boards 2, the cross-connect board 3, and the line boards 4.

The tributary board 2 completes encapsulation and mapping of a client service. The client service includes a plurality of service types, such as an asynchronous transfer mode (ATM) service, a synchronous digital hierarchy (SDH) service, an Ethernet service, a common public radio interface (CPRI) service, and a storage service. Specifically, the tributary board 2 is configured to receive a client service from the client side, encapsulates the received client service and maps the received client service to an ODU (Optical Channel Data Unit) signal, and adds a corresponding OTN management monitoring overhead. On the tributary board 2, the ODU signal may be a lower-order ODU signal, such as an ODU0, an ODU1, an ODU2, an ODU3, or an ODUflex, and the OTN management monitoring overhead may be an ODU overhead. Different types of client services are encapsulated and mapped to different ODU signals in different manners.

The cross-connect board 3 completes full cross-connection between the tributary boards and the line boards, and implements flexible cross-connection grooming on an ODU signal. Specifically, the cross-connect board may transmit an ODU signal from any tributary board to any line board, or transmit an OTU (Optical Channel Transport Unit) signal from any line board to any line board, or may transmit a client signal from any tributary board to any tributary board.

The line board 4 forms an ODU signal into an OTU signal and sends the OTU signal to the line side. Before forming the ODU signal into the OTU signal, the line board 4 may multiplex a plurality of lower order ODU signals into a higher order ODU signal. Then, a corresponding OTN management monitoring overhead is added to the higher order ODU signal to form the OTU signal, and the OTU signal is sent to an optical transport channel on the line side. On the line board, the higher order ODU signal may be an ODU1, an ODU2, an ODU3, an ODU4, or the like, and the OTN management monitoring overhead may be an OTU overhead.

It should be noted that FIG. 2 shows only a basic function, namely, an electrical processing function, of the OTN device. Based on an actual requirement, the OTN device may further include an optical layer processing module. For example, the optical layer processing module includes a multiplexer unit, a demultiplexer unit, an optical amplification unit, a wavelength conversion unit, an optical attenuation adjustment unit, an optical equalization unit, and an optical dispersion compensation unit. The units are not described one by one in this embodiment of this disclosure.

The OTN device may be used as a topology element of the ASON network. Compared with a conventional network element, a link management function, a signaling function, and a routing function are added to the OTN device. The OTN device has various functions of ASON protocols (LMP, OSPF-TE, and RSVP-TE).

LMP (Link Management Protocol) is a link management protocol. The LMP protocol runs between two adjacent nodes, and has the following main functions: (1) managing a fiber connection between the adjacent nodes; (2) implementing automatic discovery and management functions of a link resource, and discovery and management of a control channel; (3) establishing and maintaining a control channel between the adjacent nodes, where the control channel maintained by the LMP is used for only link verification, because connectivity verification and attribute consistency verification between the adjacent nodes can be performed only after an available control channel exists; (4) implementing data link connectivity verification; (5) completing physical connectivity verification of a data link, and dynamically obtaining an interface mapping relationship of the link; (6) implementing TE link attribute consistency verification; and (7) integrating a plurality of data links into one TE link and synchronizing an attribute of the TE link to ensure consistency between configurations of the attribute of the TE link in nodes at two ends.

OSPF-TE (Open Shortest Path First-Traffic Engineering) (whose main functions are topology information collection and path computation): An OSPF extended protocol OSPF-TE is used as a routing protocol of a control plane of the ASON, and has the following main functions: (1) creating and maintaining a control link; (2) establishing a neighbor relationship; (3) flooding and collecting control link information of the control plane, and accordingly generating routing information of the control plane, to provide a route for message packet forwarding of the control plane; and (4) flooding and collecting TE link information of a transport plane, to provide network service topology information for service path computation.

RSVP-TE (Resource Reservation Protocol-Traffic Engineering) (whose main function is LSP path establishment): RSVP is a resource reservation protocol, and is a type of signaling. RSVP-TE is "extended RSVP", and is an extension of RSVP in terms of traffic engineering. The RSVP-TE mainly completes the following functions: (1) LSP establishment; (2) LSP deletion; (3) LSP attribute modification; (4) LSP rerouting; and (5) LSP path optimization.

In the embodiments of this application, channel resource preconfiguration may be implemented in the following several manners, to reduce duration consumed by cross-connection configuration of nodes in a fault recovery process, thereby improving fault recovery performance. For specific implementations, refer to explanations in the following embodiments.

Figure 3:
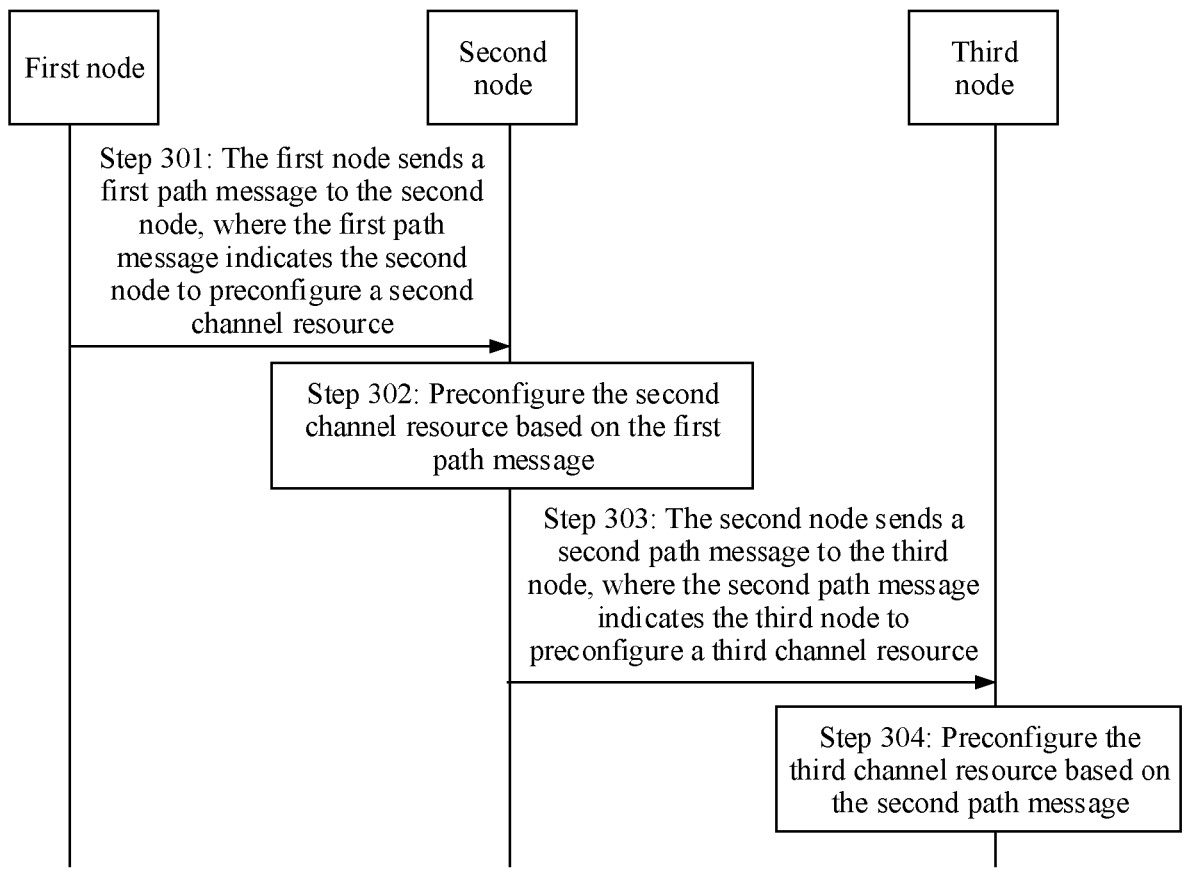
FIG. 3 is a flowchart of a service resource preconfiguration method according to an embodiment of this disclosure.

FIG. 3 is a flowchart of a service resource preconfiguration method according to an embodiment. The service resource configuration method in this embodiment may be applied to a communication system, for example, an ASON in this embodiment of this application. The communication system (may also be referred to as a communication network, a network, or the like) in this embodiment includes a first working path and a preset recovery path. The preset recovery path may include a first node and a second node. As shown in FIG. 3, the service resource preconfiguration method in this embodiment may include the following steps.

Step 301: After establishment of the first working path is completed, the first node sends a first path message to the second node, where the first path message indicates the second node to preconfigure a second channel resource, and the first working path is used to transmit a first service flow.

Both the first node and the second node have various functions of the foregoing ASON protocols. Network information such as nodes and links in the network may be automatically obtained by using OSPF/OSPF-TE in the ASON protocols. In this embodiment, the first node may obtain information about another node in the communication system based on OSPF, where the information includes node information, link information, and the like. Then, the first node computes a working path from an end (for example, a node) to an end (for example, another node in the network) based on CSPF, namely, the first working path. Finally, establishment of the first working path is completed by using RSVP-TE. The first node may be a source node of the first service flow.

After establishment of the working path is completed, the first node may compute the preset recovery path of the first working path. The preset recovery path is used to transmit the first service flow when the first working path is faulty. It should be noted that, in some embodiments, the preset recovery path may be further used to: when another working path is faulty, transmit a service flow originally transmitted on the another working path.

In order that when the first working path is faulty, the first working path can be fast switched to the preset recovery path to continue to transmit the first service flow, to implement fast automatic service recovery and improve fault recovery performance, after establishment of the first working path is completed, the first node in this embodiment of this application indicates, by using the first path message, nodes (for example, the second node) of the preset recovery path to preconfigure channel resource, to reduce duration consumed for configuring a cross-connection by the nodes in a fault recovery process. In other words, channel resource configuration of the second node of the preset recovery path is completed before a fault occurs, thereby saving time for configuring the channel resource by the node in a fault recovery process.

The first path message may be a message that is based on RSVP-TE, for example, a path message. In a feasible manner, the first path message may carry channel resource configuration information of the second node, and the channel resource configuration information of the second node is used to configure the second channel resource, namely, a channel resource of the second node.

The preset recovery path also includes the first node. Therefore, after establishment of the first working path is completed, the first node may configure a first channel resource, that is, a channel resource of the first node. The channel resource of the first node may be used to transmit the first service flow. In some embodiments, the channel resource of the first node may be further used to transmit another service flow, that is, the first channel resource is shared in the network.

The first node may configure the first channel resource when sending the first path message, after sending the first path message, or before sending the first path message. This is not specifically limited in this embodiment of this application.

In some embodiments, the channel resource may include at least one of a line board ODUk or a backplane ODUk. For example, the channel resource of the second node may include at least one of a line board ODUk or a backplane ODUk of the second node. It should be noted that a backplane may be the backplane 5 shown in FIG. 2. k is 0, 1, 2, 2e, 3, 4, or flex (flex). Different values of k correspond to different rate levels and also correspond to different slot quantities. For example, an ODU0 corresponds to one slot, and an ODU1 corresponds to two slots.

Step 302: The second node preconfigures the second channel resource based on the first path message.

The channel resource of the second node may be used to transmit the first service flow. In some embodiments, the channel resource of the second node may be further used to transmit another service flow, that is, the second channel resource is shared in the network.

The preconfiguring the second channel resource may be understood as completing channel resource configuration of the second node of the preset recovery path before a fault occurs, that is, the second node completes allocation of the channel resource of the second node before the fault occurs. The channel resource may be used to transmit the first service flow and/or another service flow.

In a feasible manner, the second channel resource is shared in the network, that is, the second channel resource can be used to transmit not only the first service flow but also another service flow. The first path message may include resource sharing identification information, and the resource sharing identification information may be used to indicate the second node that the second channel resource can be shared in the network. That is, the first node adds the resource sharing identification information to the first path message, to indicate that the channel resource preconfigured by the second node can be shared with another service flow. The second node may pre-allocate the second channel resource (may also be referred to as reserving the second channel resource) based on the first path message, and establish a correspondence between the second channel resource and a resource sharing identifier. During service fault recovery, the path message used to trigger the nodes (for example, the second node) of the preset recovery path to complete cross-connection configuration may carry the resource sharing identification information, so that the nodes (for example, the second node) of the preset recovery path can determine the pre-allocated channel resources based on the resource sharing identification information, and use the channel resources to transmit the service flow on which fault recovery is performed.

It should be noted that sharing of the second channel resource in the network may be resource sharing for any service type, or may be resource sharing for a specified service type. For the resource sharing for the specified service type, it may be understood that the first path message may further include a channel resource configuration type, and the channel resource configuration type indicates a service-level agreement (SLA) type supported by the second channel resource. The SLA type may include but is not limited to the following several types: service rerouting, shared MESH protection reservation, 1+R sharing, 1+1 sharing, and the like. For example, the first node adds the channel resource configuration type to the first path message, to indicate that the channel resource preconfigured by the second node can be shared with another service flow of the channel resource configuration type. The second node may pre-allocate the second channel resource based on the first path message. During service fault recovery, another service flow of the channel resource configuration type is allowed to use the second channel resource.

In another feasible manner, the second channel resource is used to transmit only the first service flow. The first path message may include service identification information, and the service identification information is used to configure a service corresponding to the preset recovery path, for example, a service corresponding to the first service flow. That is, the first node adds the service identification information to the first path message, to indicate that the channel resource preconfigured by the second node is used to transmit only a service flow (the first service flow) corresponding to the service identification information. The second node may pre-allocate the second channel resource based on the first path message, and establish a correspondence between the second channel resource and the service identification information. During service fault recovery, the path message used to trigger the nodes (for example, the second node) of the preset recovery path to complete cross-connection configuration may carry the service identification information, so that the nodes (for example, the second node) of the preset recovery path can determine the pre-allocated channel resources based on the service identification information, and use the channel resources to transmit the first service flow on which fault recovery is performed.

The second node is a node directly connected to the first node (source node). In some embodiments, the second node may be a sink node (the last node of the preset recovery path). In some other embodiments, the second node may be a non-sink node (an intermediate node of the preset recovery path), the preset recovery path may further include at least one third node, and the at least one third node may include a sink node, or a sink node and another intermediate node. The first path message may further include channel resource configuration information of the at least one third node, and the channel resource configuration information of the at least one third node indicates the corresponding third node to preconfigure a channel resource of the third node, where the channel resource may also be referred to as a third channel resource.

The following steps are optional, and the following steps are described by using an example in which the network further includes one third node.

Step 303: The second node sends a second path message to the third node, where the second path message indicates the third node to preconfigure a third channel resource.

When the preset recovery path further includes the third node, the first path message sent by the first node to the second node carries the channel resource configuration information of the second node and channel resource configuration information of the third node. The second node extracts the channel resource configuration information of the second node from the first path message; and generates the second path message and sends the second path message to the third node. The second path message carries the channel resource configuration information of the third node, and the channel resource configuration information of the third node is used to configure the third channel resource, namely, a channel resource of the third node. The second path message may be a message that is based on RSVP-TE, for example, a path message.

Step 304: The third node preconfigures the third channel resource based on the second path message.

The channel resource of the third node may be used to transmit the first service flow. In some embodiments, the channel resource of the third node may be further used to transmit another service flow, that is, the third channel resource is shared in the network. For explanations of the third channel resource and the second path message, refer to the explanations of the second channel resource and the first path message in step 301 and step 302. For example, the third channel resource may be shared in the network, shared for a specified service type, and used to transmit only the first service flow. A processing process of the second path message and the third node is similar to the processing process of the first path message and the second node. Details are not described herein.

In this embodiment, after establishment of the first working path is completed, the first node sends the first path message to the second node, where the first path message indicates the second node to preconfigure the second channel resource; and the second node preconfigures the second channel resource based on the first path message. Channel resource configuration of the second node of the preset recovery path is completed before a fault occurs, thereby saving time for configuring the channel resource by the node in a fault recovery process. Therefore, when the first working path is faulty, the first working path can be fast switched to the preset recovery path to continue to transmit the first service flow, to implement fast automatic service recovery and improve fault recovery performance.

Figure 4:
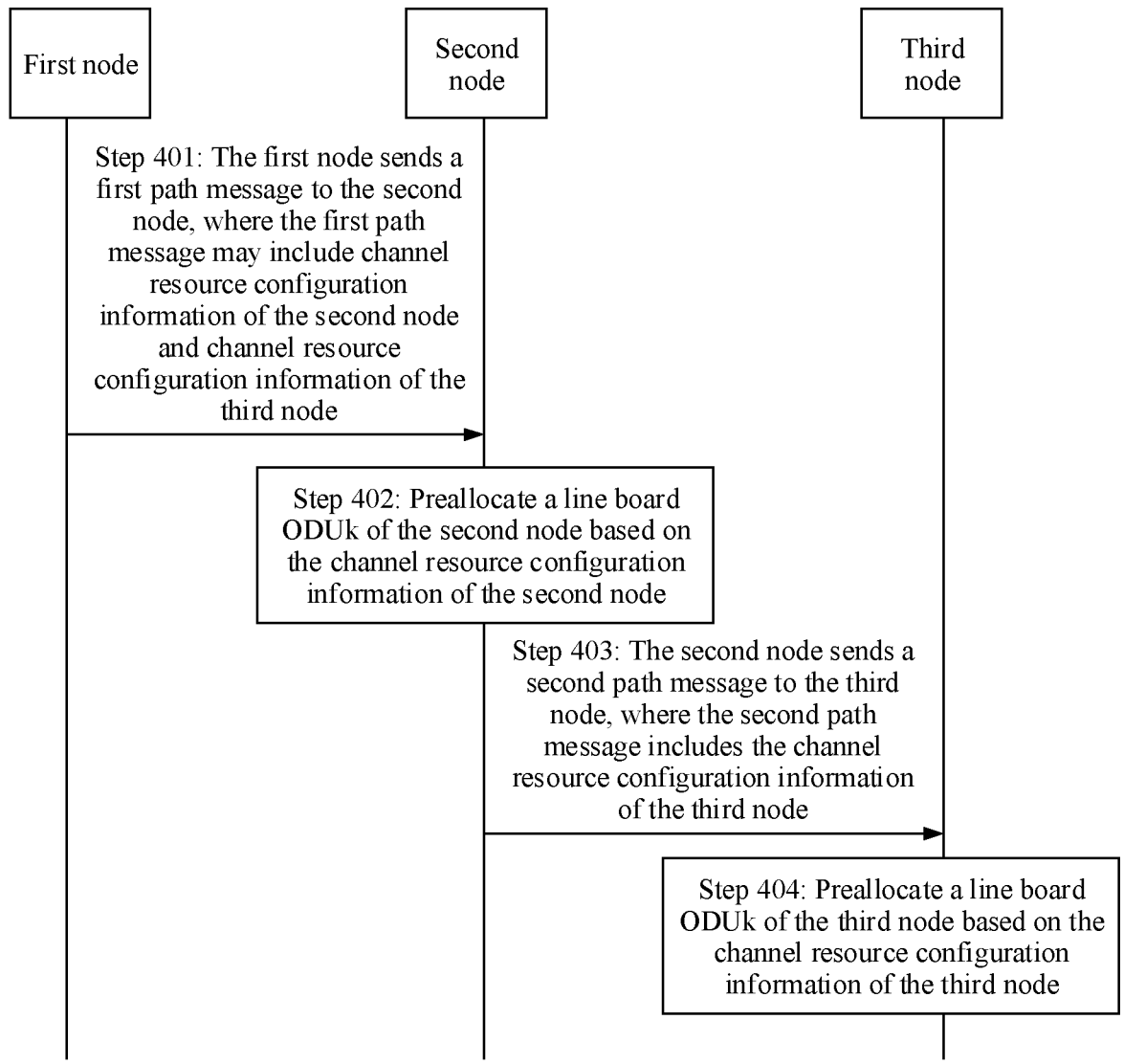
FIG. 4 is a flowchart of another service resource preconfiguration method according to an embodiment of this disclosure.

FIG. 4 is a flowchart of another service resource preconfiguration method according to an embodiment. In this embodiment, based on the embodiment shown in FIG. 3, the channel resource configuration information in the foregoing embodiment is explained by using an example in which a preset recovery path includes a first node, a second node, and a third node and a channel resource includes a line board ODUk. As shown in FIG. 4, the service resource preconfiguration method in this embodiment of this application may include the following steps.

Step 401: After establishment of a first working path is completed, the first node sends a first path message to the second node, where the first path message may include channel resource configuration information of the second node and channel resource configuration information of the third node.

The channel resource configuration information of the second node includes at least one of the following information: line board identification information, port identification information, and channel resource information of the second node. The line board identification information is used to configure a line board on which at least one ODUk reserved by the second node is located. For example, as shown in FIG. 2, the second node may include a plurality of line boards, and the line board identification information may indicate to reserve ODUks on one or more line boards of the second node. The port identification information is used to configure a port on which the at least one ODUk reserved by the second node is located. In other words, the port identification information may indicate to reserve the ODUks on one or more ports of the one or more line boards of the second node. The channel resource information is used to identify the ODUk that is on the port of the line board and that is reserved by the second node, and the ODUk that is on the port of the line board and that is reserved by the second node is used for service fault recovery.

For example, the channel resource information may include channel identification information and a slot quantity, the channel identification information indicates a channel of the ODUk reserved by the second node, and the slot quantity indicates a slot quantity of the ODUk reserved by the second node. For example, the channel identification information may be a channel number.

Step 402: The second node pre-allocates the line board ODUk of the second node based on the channel resource configuration information of the second node.

For example, the second node may pre-allocate the corresponding ODUk on the port of the corresponding line board based on the line board identification information, the port identification information, and the channel resource information of the second node. The ODUk may be used to transmit the foregoing first service flow when the first working path is faulty.

Step 403: The second node sends a second path message to the third node, where the second path message includes the channel resource configuration information of the third node.

The channel resource configuration information of the third node includes at least one of the following information: line board identification information, port identification information, and channel resource information of the third node. The line board identification information is used to configure a line board on which at least one ODUk reserved by the third node is located. For example, as shown in FIG. 2, the third node may include a plurality of line boards, and the line board identification information may indicate to reserve ODUks on one or more line boards of the third node. The port identification information is used to configure a port on which the at least one ODUk reserved by the third node is located. In other words, the port identification information may indicate to reserve the ODUks on one or more ports of the one or more line boards of the third node. The channel resource information is used to identify the ODUk that is on the port of the line board and that is reserved by the third node, and the ODUk that is on the port of the line board and that is reserved by the third node is used for service fault recovery.

For example, the channel resource information may include channel identification information and a slot quantity, the channel identification information indicates a channel of the ODUk reserved by the third node, and the slot quantity indicates a slot quantity of the ODUk reserved by the third node. For example, the channel identification information may be a channel number.

Step 404: The third node pre-allocates the line board ODUk of the third node based on the channel resource configuration information of the third node.

For example, the third node may pre-allocate the corresponding ODUk on the port of the corresponding line board based on the line board identification information, the port identification information, and the channel resource information of the third node. The ODUk may be used to transmit the foregoing first service flow when the first working path is faulty.

In this embodiment, after establishment of the first working path is completed, the first node sends the first path message to the second node, where the first path message may include the channel resource configuration information of the second node and the channel resource configuration information of the third node; the second node pre-allocates the line board ODUk of the second node based on the channel resource configuration information of the second node; and the third node pre-allocates the line board ODUk of the third node based on the channel resource configuration information of the third node. Pre-allocation of the line board ODUks of the second node and the third node of the preset recovery path is completed before a fault occurs, thereby saving time for configuring the line board ODUks by the nodes in a fault recovery process. Therefore, when the first working path is faulty, the first working path can be fast switched to the preset recovery path to continue to transmit the first service flow, to implement fast automatic service recovery and improve fault recovery performance.

After establishment of the first working path is completed, the first node in this embodiment of this application preconfigures line board ODUks for nodes (for example, the second node and the third node) of the preset recovery path by using the first path message, to reduce duration consumed for configuring a cross-connection by the nodes in a fault recovery process.

The configuring a cross-connection in this disclosure includes the following four items: (1) configuring a tributary board cross-connection, where the node establishes a cross-connection between sending and receiving directions of a tributary board and a backplane based on this; (2) configuring a cross-connect board cross-connection, where the node establishes a cross-connection between a cross-connect board and a tributary board/line board; (3) configuring a line board ODUk, where the node establishes line board ODUk slot mapping based on this; and (4) configuring a line board cross-connection, where the node establishes a cross-connection between sending and receiving directions of a line board and a backplane based on this. In this embodiment of this application, before a service fault occurs, configuration of the line board ODUk in (3) is completed, and the node establishes the line board ODUk slot mapping based on this. During service fault recovery, the three other items can be fast completed, to reduce duration consumed for configuring a cross-connection by the nodes in a fault recovery process, thereby improving fault recovery performance.

The line board ODUk slot mapping in this embodiment indicates mapping between a slot of a pre-allocated line board ODUk and a service. For example, the slot of the pre-allocated line board ODUk is used to transmit the first service flow, or a service flow of a specified service resource type.

Different from that the source node of the first service flow computes the working path and the preset recovery path in the foregoing embodiments shown in FIG. 3 and FIG. 4, in the following embodiment shown in FIG. 5, a network device (for example, a PCE) computes a working path and a preset recovery path, and completes a service resource configuration method in this application. For a specific implementation thereof, refer to an explanation in the following embodiment.

Figure 5:
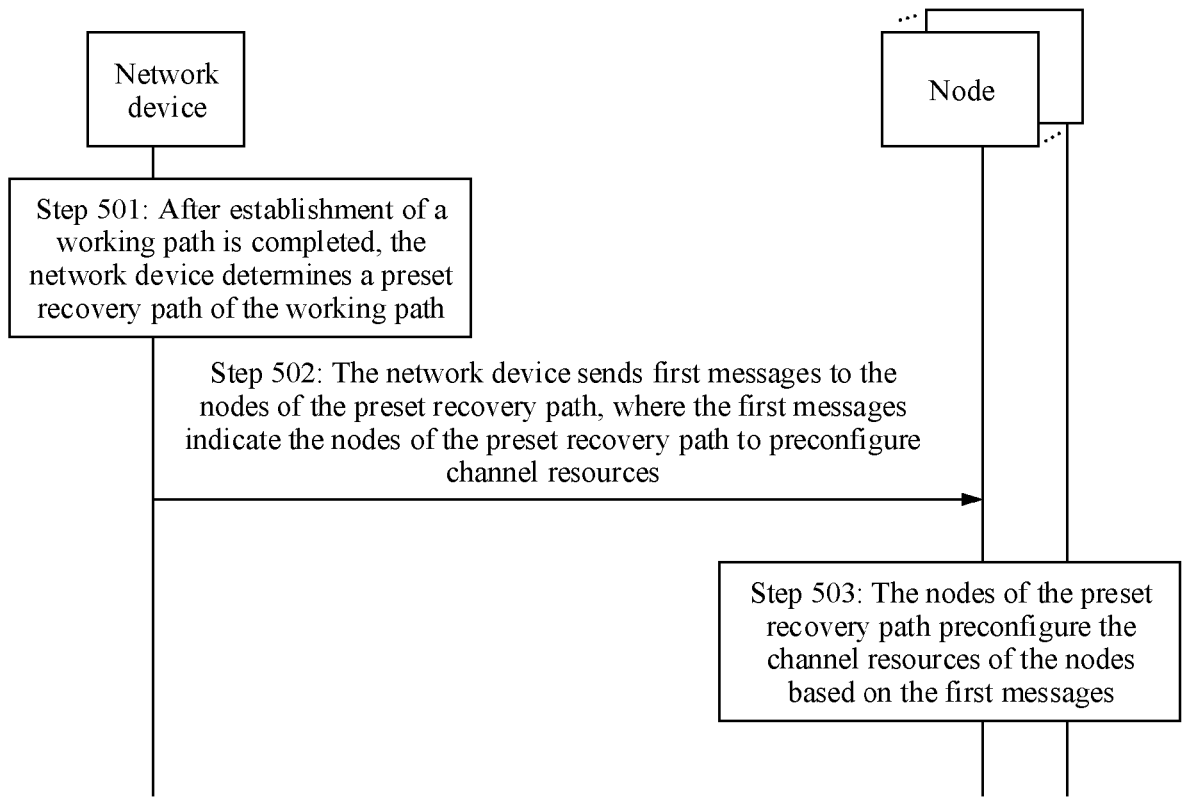
FIG. 5 is a flowchart of another service resource preconfiguration method according to an embodiment of this disclosure.

FIG. 5 is a flowchart of another service resource preconfiguration method according to an embodiment. The service resource configuration method in this embodiment may be applied to a communication system, for example, an ASON in this embodiment of this application. The communication system (may also be referred to as a communication network, a network, or the like) in this embodiment includes a working path and a preset recovery path. The preset recovery path may include a plurality of nodes, for example, a first node and a second node. The network device can manage and control nodes in the communication system. As shown in FIG. 5, the service resource preconfiguration method in this embodiment of this application may include the following steps.

Step 501: After establishment of the working path is completed, the network device determines the preset recovery path of the working path.

The network device may automatically obtain information such as the nodes, links, and service information in the network according to a protocol such as OSPF/PCEP. Based on this, the network device may determine a working path from an end (for example, a node) to an end (for example, another node in the network), and complete establishment of the working path. The working path may be used to transmit the foregoing first service flow.

After establishment of the working path is completed, the network device may compute the preset recovery path of the working path. The preset recovery path is used to: when the working path is faulty, transmit a service flow, for example, the foregoing first service flow, previously transmitted on the working path. It should be noted that, in some embodiments, channel resources of the nodes of the preset recovery path may be further used to: when another working path is faulty, transmit a service flow originally transmitted on the another working path.

Step 502: The network device sends first messages to the nodes of the preset recovery path, where the first messages indicate the nodes of the preset recovery path to preconfigure the channel resources.

In order that when the working path is faulty, the working path can be fast switched to the preset recovery path to continue to transmit the service flow, to implement fast automatic service recovery and improve fault recovery performance, after establishment of the working path is completed, the network device in this embodiment of this application preconfigures the channel resources for the nodes (for example, the first node and the second node) of the preset recovery path by using the first messages, to reduce duration consumed for configuring a cross-connection by the nodes in a fault recovery process. In other words, channel resource configuration of the nodes of the preset recovery path is completed before a fault occurs, thereby saving time for configuring the channel resources by the nodes in a fault recovery process.

The first message may be a message that is based on PCEP, for example, a PCEP message. The network device sends the first message to each node of the preset recovery path. In a feasible manner, the first messages sent by the network device to all the nodes may carry same content. The first messages may carry channel resource configuration information of all the nodes, and channel resource configuration information of each node is used to configure a channel resource of the corresponding node. In another feasible manner, the first messages sent by the network device to all the nodes may carry different content. For example, the network device sends a first message 1 to the first node, where the first message 1 carries channel resource configuration information of the first node, the channel resource configuration information of the first node is used to configure a channel resource of the first node; and the network device sends a first message 2 to the second node, where the first message 2 carries channel resource configuration information of the second node, and the channel resource configuration information of the second node is used to configure a channel resource of the second node.

For an explanation of the channel resource, refer to the related description in step 301 in the embodiment shown in FIG. 3. Details are not described herein again.

Step 503: The nodes of the preset recovery path preconfigure the channel resources of the nodes based on the first messages.

The channel resources of the nodes may be used to transmit a service flow, for example, the first service flow, originally transmitted on the working path. In some embodiments, the channel resources of the nodes may be further used to transmit another service flow, that is, the channel resources of the nodes are shared in the network.

The preconfiguring the channel resources of the nodes may be understood as completing channel resource configuration of the nodes of the preset recovery path before a fault occurs, that is, the nodes complete allocation of the channel resources of the nodes before the fault occurs. The channel resources may be used to transmit the first service flow and/or another service flow.

In a feasible manner, the channel resources of the nodes are shared in the network, that is, the channel resources of the nodes can be used to transmit not only the first service flow but also another service flow. The first messages may include resource sharing identification information, and the resource sharing identification information may be used to indicate the nodes that the channel resources preconfigured by the nodes can be shared in the network. That is, the network device adds the resource sharing identification information to the first messages, to indicate that the channel resources preconfigured by the nodes can be shared with another service flow. The nodes may pre-allocate the channel resources (may also be referred to as reserving the channel resource) based on the first messages, and establish correspondences between the channel resources and a resource sharing identifier. During service fault recovery, the path messages used to trigger the nodes (for example, the first node and the second node) of the preset recovery path to complete cross-connection configuration may carry the resource sharing identification information, so that the nodes (for example, the first node and the second node) of the preset recovery path can determine the pre-allocated channel resources based on the resource sharing identification information, and use the channel resources to transmit the service flow on which fault recovery is performed.

It should be noted that sharing of the channel resources of the nodes in the network may be resource sharing for any service type, or may be resource sharing for a specified service type. For the resource sharing for the specified service type, it may be understood that the first messages may further include a channel resource configuration type, and the channel resource configuration type indicates a service-level agreement (SLA) type supported by the channel resources. The SLA type may include but is not limited to the following several types: service rerouting, shared MESH protection reservation, 1+R sharing, 1+1 sharing, and the like. For example, the network device adds the channel resource configuration type to the first messages, to indicate that the channel resources preconfigured by the nodes can be shared with another service flow of the channel resource configuration type. The nodes may pre-allocate the channel resources based on the first messages. During service fault recovery, another service flow of the channel resource configuration type is allowed to use the channel resources.

In another feasible manner, the channel resources of the nodes are used to transmit only the first service flow. The first messages may include service identification information, and the service identification information is used to configure a service corresponding to the preset recovery path, for example, a service corresponding to the first service flow. That is, the network device adds the service identification information to the first messages, to indicate that the channel resources preconfigured by the nodes are used to transmit only a service flow (the first service flow) corresponding to the service identification information. The nodes may pre-allocate the channel resources based on the first messages, and establish correspondences between the channel resources and the service identification information. During service fault recovery, the path messages used to trigger the nodes (for example, the first node and the second node) of the preset recovery path to complete cross-connection configuration may carry the service identification information, so that the nodes (for example, the first node and the second node) of the preset recovery path can determine the pre-allocated channel resources based on the service identification information, and use the channel resources to transmit the first service flow on which fault recovery is performed.

The nodes include a source node, an intermediate node, and a sink node of the preset recovery path.

For an explanation of the channel resource configuration information of the nodes, refer to the explanation of the channel resource configuration information in the embodiment shown in FIG. 4. For example, the channel resource configuration information of each node may include line board identification information, port identification information, and channel resource information of the node. Details are not described herein in this embodiment of this application.

Optionally, to implement channel resource sharing and improve channel resource utilization, the nodes of the preset recovery path may further flood the resource sharing identification information.

In this embodiment, after establishment of the working path is completed, the network device separately sends the first messages to the nodes of the preset recovery path, where the first messages indicate the nodes to preconfigure the channel resources; and the nodes preconfigure the channel resources based on the first messages. Channel resource configuration of the nodes of the preset recovery path is completed before a fault occurs, thereby saving time for configuring the channel resources by the nodes in a fault recovery process. Therefore, when the working path is faulty, the working path can be fast switched to the preset recovery path to continue to transmit the first service flow, to implement fast automatic service recovery and improve fault recovery performance.

Different from the foregoing embodiment shown in FIG. 5, nodes in the following embodiment shown in FIG. 6 may further support a network slice function. A network slice manager may perform slice resource management. In a slice resource management process, the network slice manager completes a service resource configuration method in this application. For a specific implementation thereof, refer to an explanation in the following embodiment.

Figure 6:
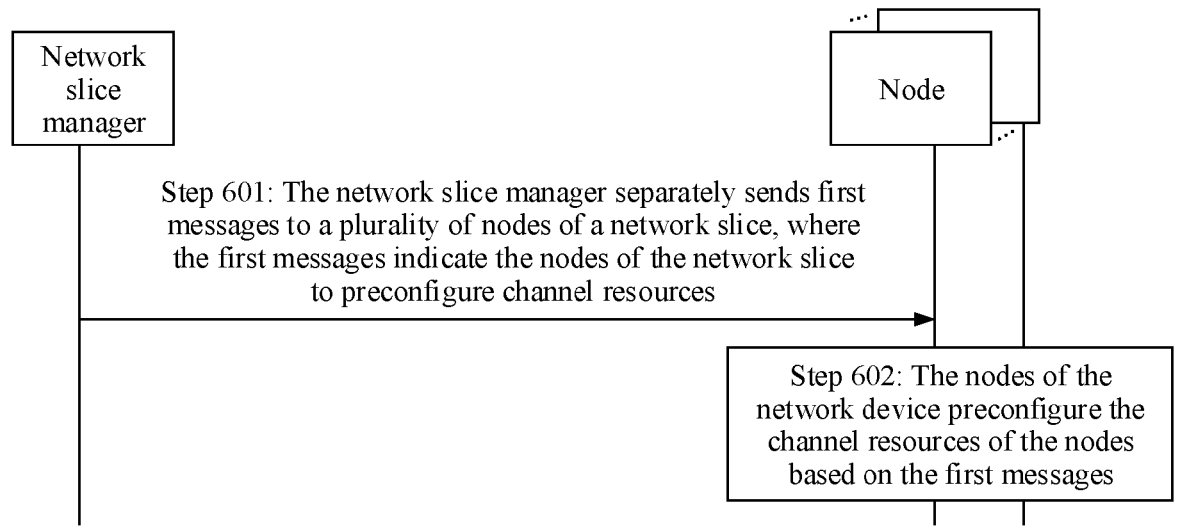
FIG. 6 is a flowchart of another service resource preconfiguration method according to an embodiment of this disclosure.

FIG. 6 is a flowchart of another service resource preconfiguration method according to an embodiment of this application. The service resource configuration method in this embodiment may be applied to a communication system, for example, an ASON in this embodiment. The communication system (may also be referred to as a communication network, a network, or the like) in this embodiment includes a plurality of nodes, for example, a first node and a second node. A network slice manager can manage and control the nodes in the communication system. The network slice manager may be a network device, for example, a PCE, having a network slice function. As shown in FIG. 6, the service resource preconfiguration method in this embodiment of this disclosure may include the following steps.

Step 601: The network slice manager separately sends first messages to a plurality of nodes of a network slice, where the first messages indicate the nodes of the network slice to preconfigure channel resources.

The channel resources are used to establish a service path, and the service path may be a service recovery path.

The network slice manager may compute a same-rate network slice based on a node configuration request, a bandwidth configuration request, a rate configuration request, or the like, where nodes of the network slice include a plurality of nodes. For example, the network slice may be an ODU0 network slice, an ODU1 network slice, or the like.

To implement fast automatic service recovery and improve fault recovery performance, in a slice resource management process, the network slice manager in this embodiment preconfigures the channel resources for the nodes (for example, the first node and the second node) of the network slice by using the first messages, to reduce duration consumed for configuring a cross-connection by the nodes in a fault recovery process. In other words, channel resource configuration of the nodes of the preset recovery path is completed before a fault occurs, thereby saving time for configuring the channel resources by the nodes in a fault recovery process.

The first message may be a network slice establishment message or a network slice update message. The network slice manager sends the first message to each node of the preset recovery path. In a feasible manner, the first messages sent by the network slice manager to all the nodes may carry same content. The first messages may carry channel resource configuration information of all the nodes, and channel resource configuration information of each node is used to configure a channel resource of the corresponding node. In another feasible manner, the first messages sent by the network slice manager to all the nodes may carry different content. For example, the network slice manager sends a first message 1 to the first node, where the first message 1 carries channel resource configuration information of the first node, the channel resource configuration information of the first node is used to configure a channel resource of the first node; and the network slice manager sends a first message 2 to the second node, where the first message 2 carries channel resource configuration information of the second node, and the channel resource configuration information of the second node is used to configure a channel resource of the second node.

In some embodiments, the channel resource may include at least one of a line board ODUk or a backplane ODUk. For example, the channel resource of the second node may include at least one of a line board ODUk or a backplane ODUk of the second node. It should be noted that a backplane may be the backplane 5 shown in FIG. 2. k is 0, 1, 2, 2e, 3, 4, or flex (flex). Different values of k correspond to different rate levels and also correspond to different slot quantities. For example, an ODU0 corresponds to one slot, and an ODU1 corresponds to two slots.

Step 602: The nodes of the network device preconfigure the channel resources of the nodes based on the first messages.

The channel resources of the nodes may be used to transmit a same-rate ODUk service flow. That is, the channel resources of the nodes are shared in the same network slice.

The preconfiguring the channel resources of the nodes may be understood as completing channel resource configuration of the nodes of the preset recovery path before a fault occurs, that is, the nodes complete allocation of the channel resources of the nodes before the fault occurs. The channel resources may be used to transmit the same-rate ODUk service flow.

In a feasible manner, the channel resources of the nodes are shared in the network slice, that is, the channel resources of the nodes may be used to transmit the same-rate ODUk service flow. The first messages may include resource sharing identification information, and the resource sharing identification information may be used to indicate the nodes that the channel resources preconfigured by the nodes can be shared by a plurality of services in the network slice. That is, the network slice manager adds the resource sharing identification information to the first messages, to indicate that the channel resources preconfigured by the nodes can be shared with another service flow. The nodes may pre-allocate the channel resources (may also be referred to as reserving the channel resource) based on the first messages, and establish correspondences between the channel resources and a resource sharing identifier. During service fault recovery, the path messages used to trigger the nodes (for example, the first node and the second node) of the preset recovery path to complete cross-connection configuration may carry the resource sharing identification information, so that the nodes (for example, the first node and the second node) of the preset recovery path can determine the pre-allocated channel resources based on the resource sharing identification information, and use the channel resources to transmit the service flow on which fault recovery is performed.

It should be noted that sharing of the channel resources of the nodes in the network slice may be resource sharing for any service type, or may be resource sharing for a specified service type. For the resource sharing for the specified service type, it may be understood that the first messages may further include a channel resource configuration type, and the channel resource configuration type indicates a service-level agreement (SLA) type supported by the channel resources. The SLA type may include but is not limited to the following several types: service rerouting, shared MESH protection reservation, 1+R sharing, 1+1 sharing, and the like. For example, the network slice manager adds the channel resource configuration type to the first messages, to indicate that the channel resources preconfigured by the nodes can be shared with another service flow of the channel resource configuration type. The nodes may pre-allocate the channel resources based on the first messages. During service fault recovery, another service flow of the channel resource configuration type is allowed to use the channel resources.

For an explanation of the channel resource configuration information of the nodes, refer to the explanation of the channel resource configuration information in the embodiment shown in FIG. 4. For example, the channel resource configuration information of each node may include line board identification information, port identification information, and channel resource information of the node. Details are not described herein in this embodiment of this application.

Optionally, to implement channel resource sharing and improve channel resource utilization, the nodes of the network slice may further flood the resource sharing identification information to nodes of another same-rate network slice.

In this embodiment, the network slice manager separately sends the first messages to the plurality of nodes of the network slice, where the first messages indicate the nodes of the network slice to preconfigure the channel resources; and the nodes preconfigure the channel resources based on the first messages. Channel resource configuration of the nodes is completed in the network slice resource management process, so that when a working path of a service layer is faulty, the recovery path can be fast established, to implement fast automatic service recovery and improve fault recovery performance.

In the following embodiment, with reference to a specific scenario, a service resource preconfiguration method in this embodiment is described by using an example in which channel resource preconfiguration is line board ODUk slot mapping preconfiguration, that is, the foregoing channel resource configuration information is line board ODUk slot mapping configuration information. In this embodiment of this application, line board ODUk slot mapping preconfiguration may be implemented in the following several manners, to reduce duration consumed by cross-connection configuration of nodes in a fault recovery process, thereby improving service recovery performance.

Manner 1: extending an RSVP-TE protocol to pre-establish line board ODUk slot mapping.

Figure 7:
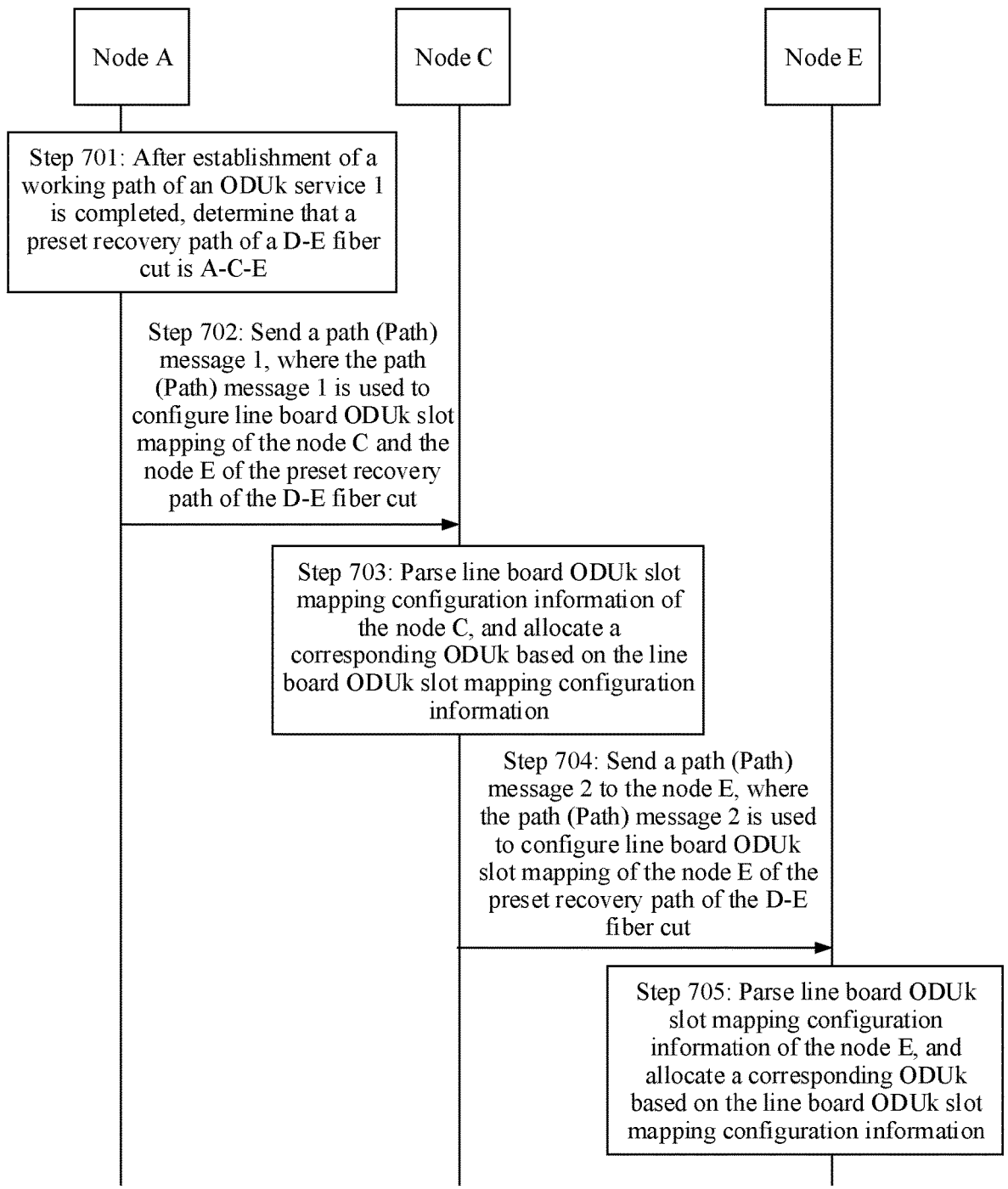
FIG. 7 is a flowchart of another service resource preconfiguration method according to an embodiment of this disclosure.
Figure 8:
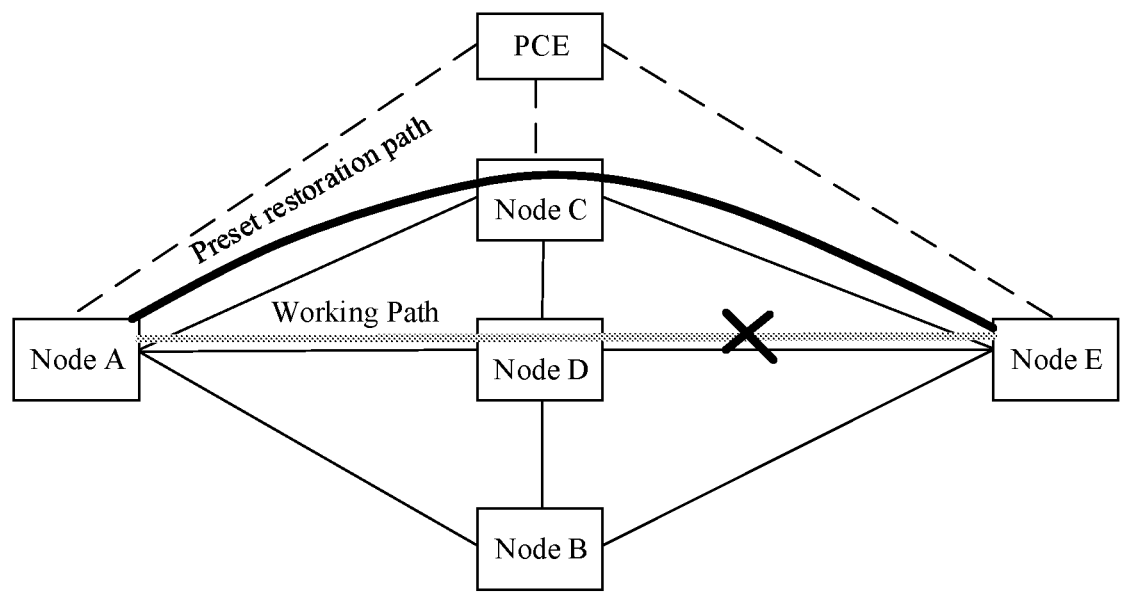
FIG. 8 is a schematic diagram of an application scenario of another service resource preconfiguration method according to an embodiment of this disclosure.

FIG. 7 is a flowchart of another service resource preconfiguration method according to an embodiment. FIG. 8 is a schematic diagram of an application scenario of another service resource preconfiguration method according to an embodiment. The application scenario includes a node A, a node B, a node C, a node D, and a node E. The node A, the node B, the node C, the node D, and the node E all have various functions of the foregoing ASON protocols. Network information such as the nodes and links may be automatically obtained by using OSPF/OSPF-TE of the ASON protocols, and end-to-end service path provisioning and recovery are automatically implemented by using RSVP-TE of the ASON protocols. A PCE automatically obtains nodes, links, and service information in an entire network according to a protocol such as OSPF/PCEP. The PCE mainly focuses on end-to-end path computation of a network service, and may be deployed in a server network management system or a device. If there is no PCE in the network, an end-to-end path of a network service may be computed by using distributed nodes. In this embodiment, an example in which the node A computes an end-to-end path of a network service is used for description. As shown in FIG. 8, a working path of an ODUk service 1 is A-D-E, and a preset recovery path is A-C-E. The manner 1 of this is described by using rerouting due to D-E fiber cut as an example. As shown in FIG. 7, the service resource preconfiguration method in this embodiment of this application may include the following steps.

Step 701: After establishment of the working path of the ODUk service 1 is completed, the node A determines that the preset recovery path of the D-E fiber cut is A-C-E.

For example, the ODUk service 1 needs to be transmitted from the node A to the node E. The node A obtains information about other nodes in the entire network based on OSPF, where the information includes node information and link information; and then computes a working path from an end (the node A) to an end (the node E) based on CSPF, namely, A-D-E. Finally, establishment of the working path is completed by using RSVP-TE.

After establishment of the working path is completed, the node A may compute the preset recovery path of the D-E fiber cut, that is, the recovery path is A-C-E. After the preset recovery path is determined, the nodes of the preset recovery path may be triggered to establish line board ODUk slot mapping, that is, the following step 702 is triggered to be performed.

Step 702: The node A sends a path message 1 to the node C, where the path message 1 is used to configure line board ODUk slot mapping of the node C and the node E of the preset recovery path of the D-E fiber cut.

In a feasible manner, the path message 1 may carry line board ODUk slot mapping configuration information of the node C and line board ODUk slot mapping configuration information of the node E. The line board ODUk slot mapping configuration information of the node C may include basic service cross-connection information and channel resource information of the node C, the basic service cross-connection information of the node C may include line board identification information, a port number, and a service bandwidth of the node C, the channel resource information is used to identify an ODUk of the node C, and the ODUk of the node C is used to transmit data traffic of the service 1. Similar to the line board ODUk slot mapping configuration information of the node C, the line board ODUk slot mapping configuration information of the node E may include basic service cross-connection information and channel resource information of the node E, the basic service cross-connection information of the node E may include line board identification information, a port number, and a service bandwidth of the node E, the channel resource information is used to identify an ODUk of the node E, and the ODUk of the node E is used to transmit the data traffic of the service 1.

In some embodiments, the line board ODUk slot mapping configuration information of the node C may further include a channel resource configuration type of the node C, the channel resource configuration type of the node C indicates an SLA type supported by the ODUk corresponding to the channel resource information, and the SLA type may include service rerouting, shared MESH protection reservation, 1+R sharing, 1+1 sharing, and the like. In other words, a data traffic of a service of the SLA type can be transmitted by using the ODUk corresponding to the channel resource information.

For example, the channel resource configuration type may be carried in an extended field, for example, a new sub-object of a hop object, in the message 1, and the first two bits of the new sub-object may be used to indicate the channel resource configuration type.

Optionally, the line board ODUk slot mapping configuration information of the node C may further include resource sharing identification information.

For example, the resource sharing identification information may be carried in the extended field, for example, the new sub-object of the hop object, in the message 1, and the last two bits of the new sub-object may be used to indicate whether the ODUk corresponding to the channel resource information can be used by another service.

Optionally, the line board ODUk slot mapping configuration information of the node C may further include service identification information, and the service identification information indicates a service whose data traffic can be transmitted by using the ODUk corresponding to the channel resource information.

Similar to the line board ODUk slot mapping configuration information of the node C, the line board ODUk slot mapping configuration information of the node E may further include a channel resource configuration type of the node E. In some embodiments, the basic service cross-connection information of the node E may further include resource sharing identification information or service identification information. For a specific explanation thereof, refer to the explanation of the related information of the node C. Details are not described herein.

Step 703: The node C parses the line board ODUk slot mapping configuration information of the node C, and allocates the corresponding ODUk based on the line board ODUk slot mapping configuration information.

In some embodiments, the channel resource information may include a channel number (the foregoing channel identification information) and an ODUk slot quantity, the channel number indicates a slot location of the allocated ODUk, the ODUk slot quantity indicates a slot size of the allocated ODUk, and the ODUk slot quantity may be alternatively determined by using the service bandwidth.

The node C may transfer the line board ODUk slot mapping configuration information that is of the node C and that is obtained through parsing to a software development kit (SDK), and allocate the corresponding ODUk by using the SDK. Then, the SDK stores slot resource information of the allocated ODUk in a chip register of a line board.

The node C obtains the line board ODUk slot mapping configuration information of the node C from the received path message 1, parses the line board ODUk slot mapping configuration information, and completes line board ODUk slot mapping of the node C based on corresponding information obtained through parsing.

Step 704: The node C sends a path message 2 to the node E, where the path message 2 is used to configure line board ODUk slot mapping of the node E of the preset recovery path of the D-E fiber cut.

The path message 2 may carry the line board ODUk slot mapping configuration information of the node E. For a specific explanation of the line board ODUk slot mapping configuration information of the node E, refer to the explanation in step 702. Details are not described herein again.

It should be noted that an execution sequence of step 703 and step 704 is not limited by sequence numbers thereof. For example, step 703 and step 704 may be simultaneously performed.

Step 705: The node E parses the line board ODUk slot mapping configuration information of the node E, and allocates the corresponding ODUk based on the line board ODUk slot mapping configuration information.

The node E obtains the line board ODUk slot mapping configuration information of the node E from the received path message 2, parses the line board ODUk slot mapping configuration information, and completes the line board ODUk slot mapping of the node E based on corresponding information obtained through parsing.

In some embodiments, when the resource sharing identification information carried in the line board ODUk slot mapping configuration information indicates that the ODUk corresponding to the channel resource information can be used by another service, the node C and the node E may flood the resource sharing identification information to the entire network.

In this embodiment, after establishment of the working path of the ODUk service 1 is completed, the line board ODUk slot mapping is preconfigured for the nodes of the recovery path by using the path messages, to reduce duration consumed by cross-connection configuration of the nodes in a fault recovery process, thereby improving service recovery performance.

Figure 9:
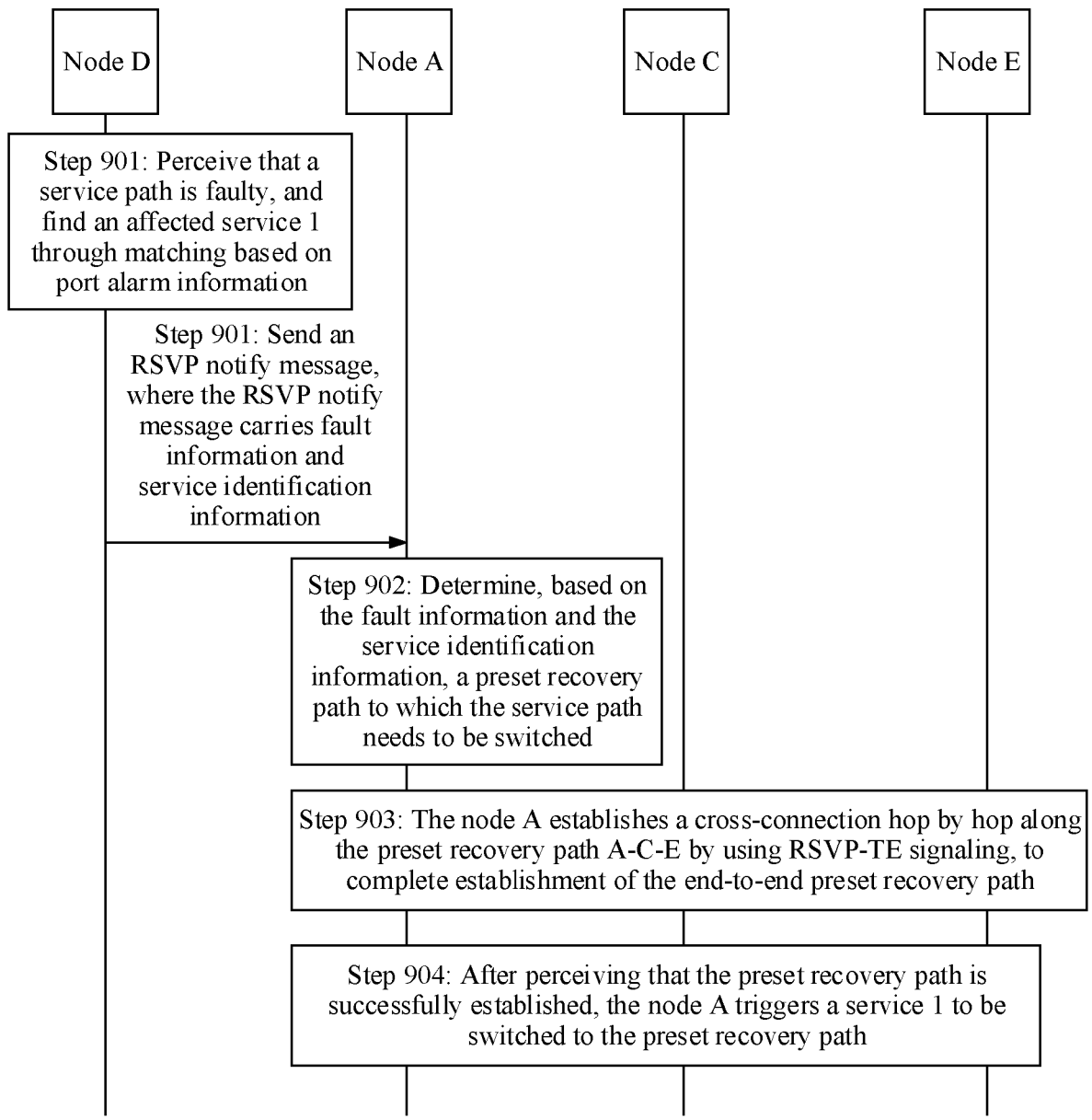
FIG. 9 is a flowchart of a service path recovery method according to an embodiment of this disclosure.

FIG. 9 is a flowchart of a service path recovery method according to an embodiment of this disclosure. In this embodiment, based on the embodiment shown in FIG. 7, after the D-E fiber cut occurs on the working path, real-time rerouting is performed based on the preset recovery path, to fast recover the service. As shown in FIG. 9, the method in this embodiment may include the following steps.

Step 901: The node D perceives that the service path is faulty, and finds the affected service 1 through matching based on port alarm information; and the node D sends an RSVP notify message to the node A, where the RSVP notify message carries fault information and service identification information.

For example, the node D receives the port alarm information, learns that the service path is faulty, and finds the affected service 1 through matching based on the port alarm information. The node D sends the RSVP notify message to the node A. The fault information may include information such as information about the faulty link and a fault cause. The node A is a source node of the affected service 1, that is, the service path fault affects data traffic transmission of the service 1. Therefore, switching of the service path to the recovery path needs to be completed by using the following steps, to avoid a data traffic transmission interruption of the service 1. The service identification information indicates the service affected by the fault.

In this embodiment, after perceiving the D-E fiber cut, the node D may trigger the ODUk service 1 to be rerouted in real time based on the preset recovery path, that is, step 901 to step 904 in this embodiment of this application may be performed.

Step 902: The node A determines, based on the fault information and the service identification information, the preset recovery path to which the service path needs to be switched.

For example, it is determined that the preset recovery path to which the service path needs to be switched is A-C-E, and the following steps are triggered to complete establishment of the preset recovery path.

Step 903: The node A establishes a cross-connection hop by hop along the preset recovery path A-C-E by using RSVP-TE signaling to complete establishment of the end-to-end preset recovery path.

The RSVP-TE signaling may include a path forward message and a Resv reverse message.

For example, the node A sends a path message 3 to the node C, where the path message 3 carries cross-configuration association information of the node C and cross-configuration association information of the node E. The node C obtains the cross-configuration association information of the node C through parsing, and establishes a reverse cross-connection based on the cross-configuration association information. The node C sends a path message 4 to the node E, where the path message 4 carries the cross-configuration association information of the node E. The node E obtains the cross-configuration association information of the node E through parsing, and establishes a reverse cross-connection based on the cross-configuration association information. The node E sends a Resv message (one of RSVP-TE protocol packets) to the node A by using the node C, and the nodes establish forward cross-connections along the path. In a same process, the node A sends a path message 5 to the node E by using the node C, and enables alarm monitoring on the service 1 along the path; and the node E sends a Resv message to the node A by using the node C, to perform acknowledgment. Establishment of the end-to-end preset recovery path is automatically completed by using the RSVP-TE signaling in the entire process.

Step 904: After perceiving that the preset recovery path is successfully established, the node A triggers the service 1 to be switched to the preset recovery path.

After perceiving that the preset recovery path is successfully established, the node A may transmit the data traffic of the service 1 by using the preset recovery path A-C-E.

In this embodiment, after establishment of the working path of the ODUk service 1 is completed, the line board ODUk slot mapping is preconfigured for the nodes of the recovery path by using the path messages. After the working path is faulty, a cross-connection may be established hop by hop along the preset recovery path A-C-E by using the RSVP-TE signaling to complete establishment of the end-to-end preset recovery path. Because the line board ODUk slot mapping is preconfigured for the nodes of the recovery path before the fault occurs, when the fault occurs, establishment of the recovery path can be fast completed, to reduce duration consumed by cross-connection configuration of the nodes in a fault recovery process, thereby improving service recovery performance.

In addition, a resource of the preset recovery path may be shared with another same-rate service, to improve resource utilization.

Manner 2: extending PCEP based on PCE to pre-establish line board ODUk slot mapping.

Figure 10:
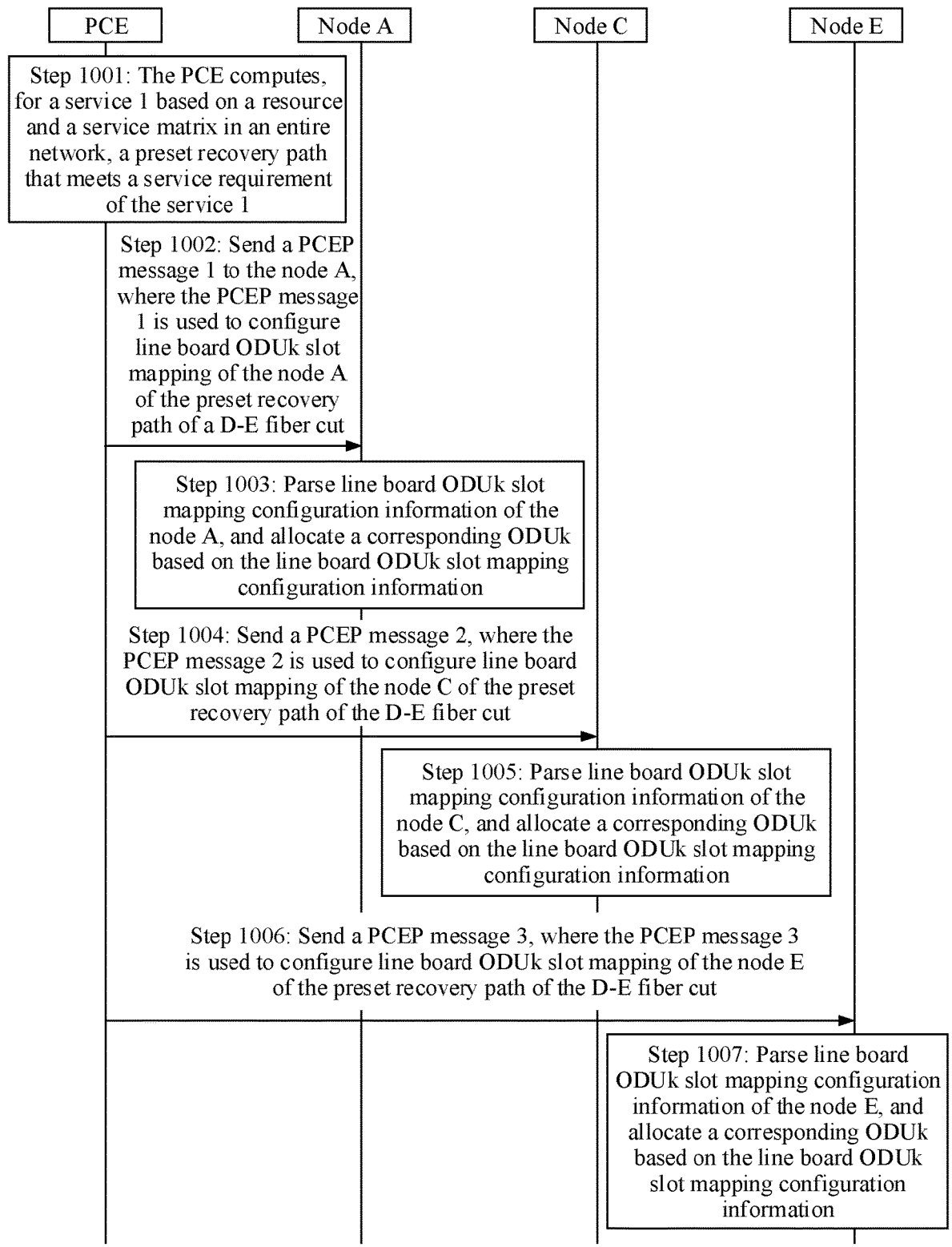
FIG. 10 is a flowchart of another service path recovery method according to an embodiment of this disclosure.

FIG. 10 is a flowchart of another service path recovery method according to an embodiment of this disclosure. In this embodiment, the application scenario shown in FIG. 8 is used. Different from the embodiment shown in FIG. 7, in this embodiment, an example in which a PCE computes an end-to-end path of a network service is used for description. As shown in FIG. 10, the method in this embodiment may include the following steps.

Step 1001: The PCE computes, for the service 1 based on a resource and a service matrix in an entire network, the preset recovery path that meets a service requirement of the service 1.

After establishment of the working path of the ODUk service 1 is completed, the PCE determines that the preset recovery path of the D-E fiber cut is A-C-E.

The PCE may further compute, for another service, a preset recovery path that meets a service requirement of the service. In a process of computing preset recovery paths of services, the PCE may concentrate recovery paths of a same ODUk rate channel as much as possible.

Step 1002: The PCE sends a PCEP message 1 to the node A, where the PCEP message 1 is used to configure line board ODUk slot mapping of the node A of the preset recovery path of the D-E fiber cut.

In a feasible manner, the PCEP message 1 may carry line board ODUk slot mapping configuration information of the node A. For specific content of the line board ODUk slot mapping configuration information, refer to the description in step 702 in the embodiment shown in FIG. 7. Details are not described herein.

Step 1003: The node A parses the line board ODUk slot mapping configuration information of the node A, and allocates a corresponding ODUk based on the line board ODUk slot mapping configuration information.

Step 1004: The PCE sends a PCEP message 2 to the node C, where the PCEP message 2 is used to configure line board ODUk slot mapping of the node C of the preset recovery path of the D-E fiber cut.

Step 1005: The node C parses line board ODUk slot mapping configuration information of the node C, and allocates a corresponding ODUk based on the line board ODUk slot mapping configuration information.

Step 1006: The PCE sends a PCEP message 3 to the node E, where the PCEP message 3 is used to configure line board ODUk slot mapping of the node E of the preset recovery path of the D-E fiber cut.

Step 1007: The node E parses line board ODUk slot mapping configuration information of the node E, and allocates a corresponding ODUk based on the line board ODUk slot mapping configuration information.

In some embodiments, when resource sharing identification information carried in the line board ODUk slot mapping configuration information indicates that the ODUk corresponding to channel resource information can be used by another service, the node A, the node C, and the node E may flood the resource sharing identification information to the entire network.

It should be noted that an execution sequence of step 1002, step 1004, and step 1006 is not limited by sequence numbers. For example, the PCE may simultaneously perform step 1002, step 1004, and step 1006.

In this embodiment, after establishment of the working path of the ODUk service 1 is completed, the line board ODUk slot mapping is preconfigured for the nodes of the recovery path by using the PCEP messages, to reduce duration consumed by cross-connection configuration of the nodes in a fault recovery process, thereby fast recovering the service and improving service recovery performance.

Manner 3: extending a network slice establishment or update message to preconfigure line board ODUk slot mapping.

Figure 11:
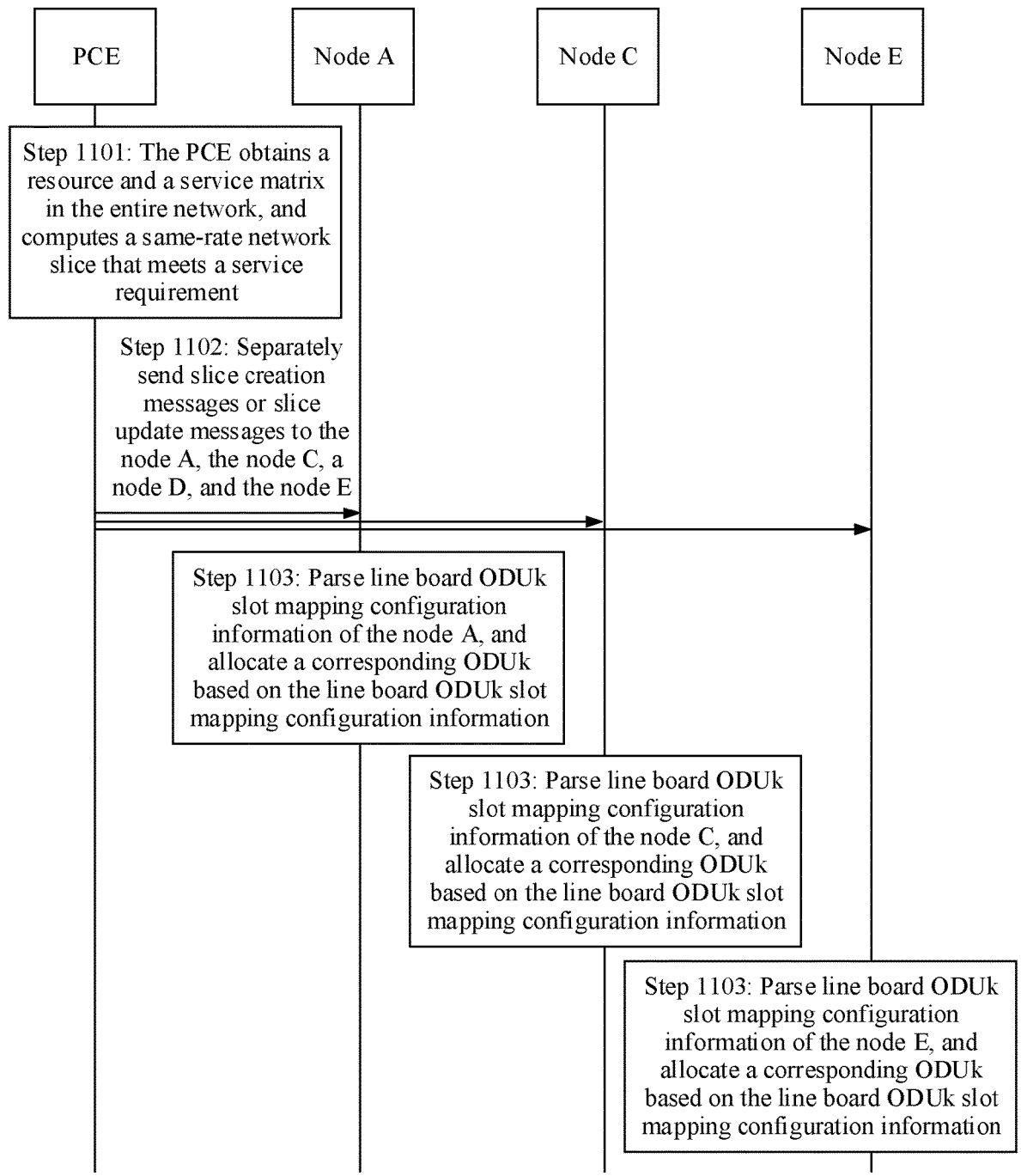
FIG. 11 is a flowchart of another service path recovery method according to an embodiment of this disclosure.

FIG. 11 is a flowchart of another service path recovery method according to an embodiment of this disclosure. In this embodiment, the application scenario shown in FIG. 8 is used. Different from the embodiment shown in FIG. 7, in this embodiment, a PCE automatically obtains nodes, links, and service information in an entire network according to a protocol such as OSPF/PCEP. The PCE supports a network slice function, and mainly focuses on computation of an end-to-end path of a network service and slice resource management, and may be deployed in a server network management system or a device. As shown in FIG. 11, the method in this embodiment may include the following steps.

Step 1101: The PCE obtains a resource and a service matrix in the entire network, and computes a same-rate network slice that meets a service requirement.

For example, the PCE computes the same-rate network slice based on a node configuration request, a bandwidth configuration request, a rate configuration request, or the like, where nodes of the network slice include the node A, the node C, the node D, and the node E.

Step 1102: The PCE separately sends slice establishment message or slice update message to the node A, the node C, the node D, and the node E.

The slice establishment message or the slice update message carry network slice identification information and line board ODUk slot mapping configuration information of the nodes. A slice establishment message or a slice update message sent by the PCE to the node C is used as an example. The slice establishment message or the slice update message carries line board ODUk slot mapping configuration information of the node C. The line board ODUk slot mapping configuration information of the node C may include basic service cross-connection information and channel resource information of the node C, the basic service cross-connection information of the node C may include line board identification information, a port number, and a service bandwidth of the node C, the channel resource information is used to identify an ODUk of the node C, and the ODUk of the node C is used to transmit data traffic of the service 1. For a specific explanation thereof, refer to that in step 702 in the embodiment shown in FIG. 7. Details are not described herein again.

Step 1103: When receiving the slice establishment message or the slice update message, the node A, the node C, the node D, and the node E parse respective line board ODUk slot mapping configuration information, and allocate corresponding ODUks based on the line board ODUk slot mapping configuration information.

In some embodiments, the ODUks corresponding to channel resource information of the node A, the node C, the node D, and the node E may be used by another service of the same network slice.

In this embodiment, line board ODUk slot mapping is preconfigured for the nodes of the network slice by using the slice establishment message or the slice update message, to reduce duration consumed by cross-connection configuration of the nodes in a fault recovery process, thereby improving service recovery performance. A same-rate ODUk service can be fast recovered based on the slice establishment message or the slice update message.

The foregoing describes in detail the service resource preconfiguration method, and the following describes a service resource preconfiguration apparatus in the embodiments of this application.

The embodiments of this disclosure describe in detail a schematic structure of the service resource preconfiguration apparatus.

Figure 12:
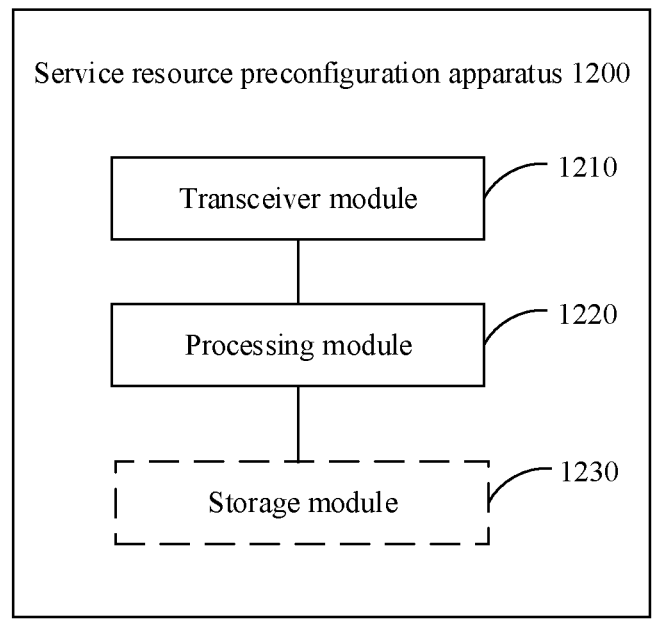
FIG. 12 is a schematic block diagram of a service resource preconfiguration apparatus 1200 according to an embodiment of this disclosure.

In an example, FIG. 12 is a schematic block diagram of a service resource preconfiguration apparatus 1200 according to an embodiment. The apparatus 1200 in this embodiment may be the first node in the foregoing method embodiment, or may be one or more chips in the first node. The apparatus 1200 may be configured to perform some or all functions of the first node in the foregoing method embodiment. The apparatus 1200 may include a transceiver module 1210 and a processing module 1220. Optionally, the apparatus 1200 may further include a storage module 1230. Detailed descriptions of the modules are as follows:

After establishment of a first working path is completed, the processing module 1220 sends a first path message to a second node by using the transceiver module 1210, where the first path message indicates the second node to preconfigure a second channel resource, the first working path is used to transmit a first service flow, the second channel resource is used to establish a preset recovery path, and the preset recovery path includes the first node and the second node.

The processing module 1220 is further configured to preconfigure a first channel resource, where the first channel resource is used to establish the preset recovery path after the first working path is faulty, and the preset recovery path is used to transmit the first service flow after the first working path is faulty.

In some embodiments, the first path message includes resource sharing identification information, and the resource sharing identification information indicates that the second channel resource is shared in a network.

In some embodiments, the processing module 1220 is further configured to: before the first node sends the first path message to the second node, compute the preset recovery path of the first working path, and generate the first path message.

In some embodiments, the preset recovery path further includes a third node, the first path message further includes channel resource configuration information of the third node, and the channel resource configuration information indicates the third node to preconfigure a third channel resource.

In some embodiments, the first channel resource is a first optical channel data unit-k ODUk reserved by the first node, and the second channel resource is a second optical channel data unit-k ODUk reserved by the second node.

In some embodiments, the first path message includes at least one of the following information: line board identification information, port identification information, and channel resource information of the second node, where the line board identification information is used to configure a line board on which the second optical channel data unit-k ODUk reserved by the second node is located, the port identification information is used to configure a port on which the second optical channel data unit-k ODUk reserved by the second node is located, the channel resource information is used to identify the second optical channel data unit-k ODUk reserved by the second node, and the second optical channel data unit-k ODUk reserved by the second node is used to establish the preset recovery path.

In some embodiments, the channel resource information includes channel identification information and a slot quantity, the channel identification information indicates a channel of the second optical channel data unit-k ODUk reserved by the second node, and the slot quantity indicates a slot quantity of the second optical channel data unit-k ODUk reserved by the second node.

In some embodiments, the first path message further includes service identification information, and the service identification information is used to configure a service on which fault recovery is performed on the preset recovery path.

In some embodiments, the first path message further includes a channel resource configuration type, and the channel resource configuration type indicates a service-level agreement SLA type supported by the second optical channel data unit-k ODUk reserved by the second node.

In some embodiments, the first path message is a message that is based on resource reservation protocol-traffic engineering RSVP-TE.

It should be noted that, for implementation of the modules, refer to the corresponding descriptions in the method embodiment shown in FIG. 3, FIG. 4, or FIG. 7, to perform the method and the function that are performed in the foregoing embodiment.

Alternatively, the apparatus 1200 may be configured as a general processing system, commonly known as, for example, a chip. The processing module 1220 may include one or more processors that provide a processing function. The transceiver module 1210 may be, for example, an input/output interface, a pin, or a circuit. The input/output interface may be configured to be responsible for information exchange between the chip system and the outside. For example, the input/output interface may output a message of the first node to another module outside the chip for processing. The processing module may execute computer-executable instructions stored in the storage module, to implement the function of the first node in the foregoing method embodiment. In an example, the storage module 1230 optionally included in the apparatus 1200 may be a storage unit inside the chip, for example, a register or a cache, or the storage module 1230 may be a storage unit that is outside the chip and that is inside the first node, for example, a read-only memory (ROM), another type of static storage device that can store static information and instructions, or a random access memory (RAM).

Figure 13:
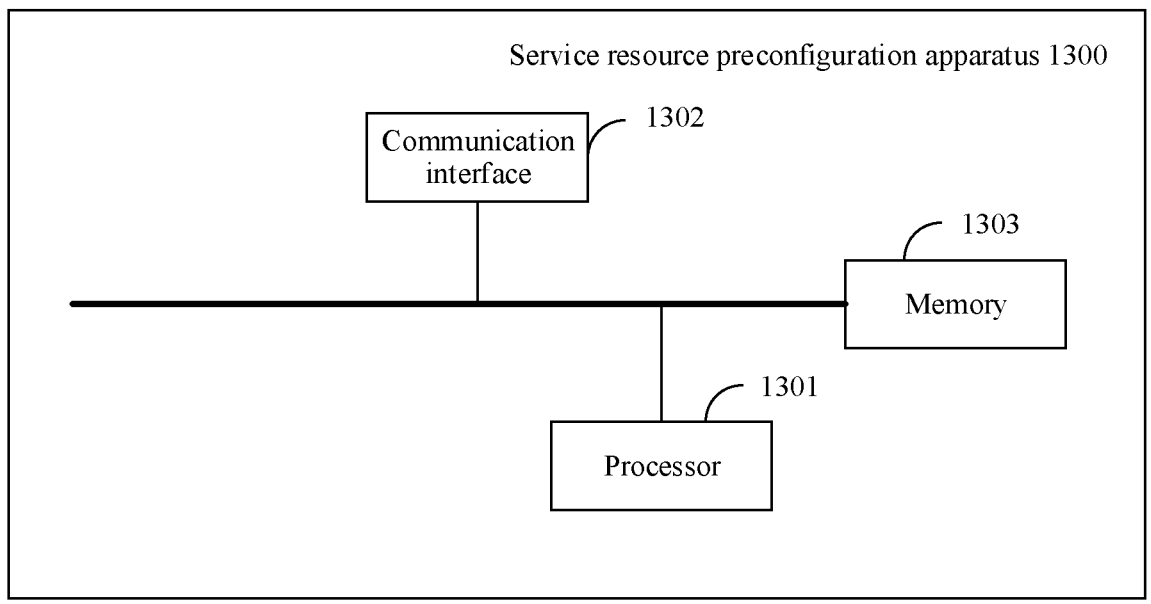
FIG. 13 is a schematic block diagram of another service resource preconfiguration apparatus 1300 according to an embodiment of this disclosure.

In another example, FIG. 13 is a schematic block diagram of another service resource preconfiguration apparatus 1300 according to an embodiment of this application. The apparatus 1300 in this embodiment of this application may be the first node in the foregoing method embodiment, and the apparatus 1300 may be configured to perform some or all functions of the first node in the foregoing method embodiment. The apparatus 1300 may include at least one processor 1301, at least one communication interface 1302, at least one memory 1303, and at least one communication bus.

The processor 1301 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication bus may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 13, but this does not mean that there is only one bus or only one type of bus. The communication bus is configured to implement connection and communication between these components. The communication interface 1302 of the first node in this embodiment of this application is configured to perform signaling or data communication with another node. The memory 1303 may include a volatile memory, for example, a nonvolatile random access memory (NVRAM), a phase change random access memory (PRAM), or a magnetoresistive random access memory (MRAM), or may include a nonvolatile memory, for example, at least one magnetic disk storage device, an electrically erasable programmable read-only memory (EEPROM), a flash memory such as a NOR flash memory or a NAND flash memory, or a semiconductor component such as a solid state drive (SSD). Optionally, the memory 1303 may be at least one storage apparatus far away from the processor 1301. The memory 1303 may be configured to store program code executed by the processor 1301.

The processor 1301 may be configured to control the first node, and is configured to perform the processing performed by the first node in the foregoing embodiment. The processor 1301 may perform the processing process related to the first node in the foregoing method embodiment and/or other processes of the technology described in this application, and may further run an operating system. The processor 1301 is responsible for managing a bus, and may execute a program or instructions stored in the memory. For example, the processor controls the communication interface to perform step 301, step 401, step 701 and step 702, or step 902 to step 904 in the foregoing method embodiment.

The memory 1303 may be configured to store program code and data of the node, and the memory 1303 may be the storage module 1230 in FIG. 12.

It may be understood that the communication interface 1302 may be the transceiver module 1210 in FIG. 12. The communication interface 1302 may be further configured to support the first node in communicating with another network entity, for example, configured to support the first node in communicating with a network device (for example, a PCE).

It may be understood that FIG. 13 shows only a simplified design of the first node. For example, in actual application, the first node may include any quantities of communication interfaces, processors, memories, and the like. All first nodes that can implement this application fall within the protection scope of this application.

An embodiment of this disclosure further provides a service resource preconfiguration apparatus. The apparatus may be a chip in the first node in the foregoing method embodiment. The chip may include the processor 1301 and the communication interface 1302 described above, or the chip may include the processor 1301 described above. The apparatus may be configured to perform some or all functions of the first node in the foregoing method embodiment. For an implementation principle and a technical effect of the apparatus, refer to the explanation in the foregoing embodiment. Details are not described herein again.

In a possible implementation, the service resource preconfiguration apparatus may be alternatively implemented by using the following: one or more field-programmable gate arrays (FPGA), a programmable logic device (PLD), a controller, a state machine, gate logic, a discrete hardware component, any other proper circuit, or any combination of circuits that can implement various functions described throughout this application. In still another example, an embodiment further provides a computer storage medium. The computer storage medium may store program instructions used to indicate any one of the foregoing methods to enable a processor to perform the program instructions to implement the method and the function that are related to the first node in the foregoing method embodiment.

Figure 14:
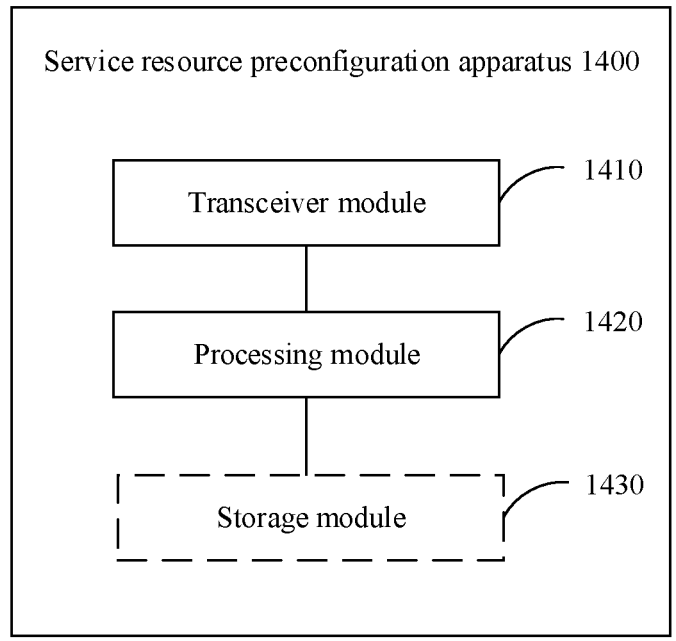
FIG. 14 is a schematic block diagram of a service resource preconfiguration apparatus 1400 according to an embodiment of this disclosure.

In an example, FIG. 14 is a schematic block diagram of a service resource preconfiguration apparatus 1400 according to an embodiment of this application. The apparatus 1400 in this embodiment may be the second node in the foregoing method embodiment, or may be one or more chips in the second node. The apparatus 1400 may be configured to perform some or all functions of the second node in the foregoing method embodiment. The apparatus 1400 may include a transceiver module 1410 and a processing module 1420. Optionally, the apparatus 1400 may further include a storage module 1430. Detailed descriptions of the modules are as follows:

The transceiver module 1410 is configured to: after establishment of a first working path is completed, receive a first path message sent by a first node where the first path message indicates the second node to preconfigure a second channel resource, the first working path is used to transmit a first service flow, the second channel resource is used to establish a preset recovery path after the first working path is faulty, to transmit the first service flow, and the preset recovery path includes the first node and the second node.

The processing module 1420 is configured to preconfigure the second channel resource based on the first path message.

In some embodiments, the first path message includes resource sharing identification information, and the resource sharing identification information indicates that the second channel resource is shared in a network.

In some embodiments, the preset recovery path further includes a third node, the first path message further includes channel resource configuration information of the third node, and the channel resource configuration information indicates the third node to preconfigure a third channel resource.

The processing module 1420 sends a second path message to the third node by using the transceiver module 1410, where the second path message includes the channel resource configuration information of the third node.

In some embodiments, the second channel resource is a second optical channel data unit-k ODUk reserved by the second node, and the third channel resource is a third optical channel data unit-k ODUk reserved by the third node.

In some embodiments, the first path message includes at least one of the following information: line board identification information, port identification information, and channel resource information of the second node, where the line board identification information is used to configure a line board on which the second optical channel data unit-k ODUk reserved by the second node is located, the port identification information is used to configure a port on which the second optical channel data unit-k ODUk reserved by the second node is located, the channel resource information is used to identify the second optical channel data unit-k ODUk reserved by the second node, and the second optical channel data unit-k ODUk reserved by the second node is used to establish the preset recovery path.

In some embodiments, the channel resource information includes channel identification information and a slot quantity, the channel identification information indicates a channel of the second optical channel data unit-k ODUk reserved by the second node, and the slot quantity indicates a slot quantity of the second optical channel data unit-k ODUk reserved by the second node.

In some embodiments, the first path message further includes service identification information, and the service identification information is used to configure a service on which fault recovery is performed on the preset recovery path.

In some embodiments, the first path message further includes a channel resource configuration type, and the channel resource configuration type indicates a service-level agreement SLA type supported by the second optical channel data unit-k ODUk reserved by the second node.

In some embodiments, the first path message is a message that is based on resource reservation protocol-traffic engineering RSVP-TE, and the second path message is a message that is based on resource reservation protocol-traffic engineering RSVP-TE.

It should be noted that, for implementation of the modules, refer to the corresponding descriptions in the method embodiment shown in FIG. 3, FIG. 4, or FIG. 7, to perform the method and the function that are performed in the foregoing embodiment.

Alternatively, the apparatus 1400 may be configured as a general processing system, commonly known as, for example, a chip. The processing module 1420 may include one or more processors that provide a processing function. The transceiver module 1410 may be, for example, an input/output interface, a pin, or a circuit. The input/output interface may be configured to be responsible for information exchange between the chip system and the outside. For example, the input/output interface may output a message of the second node to another module outside the chip for processing. The processing module may execute computer-executable instructions stored in the storage module, to implement the function of the second node in the foregoing method embodiment. In an example, the storage module 1430 optionally included in the apparatus 1400 may be a storage unit inside the chip, for example, a register or a cache, or the storage module 1430 may be a storage unit that is outside the chip and that is inside the second node, for example, a read-only memory (ROM), another type of static storage device that can store static information and instructions, or a random access memory (RAM).

Figure 15:
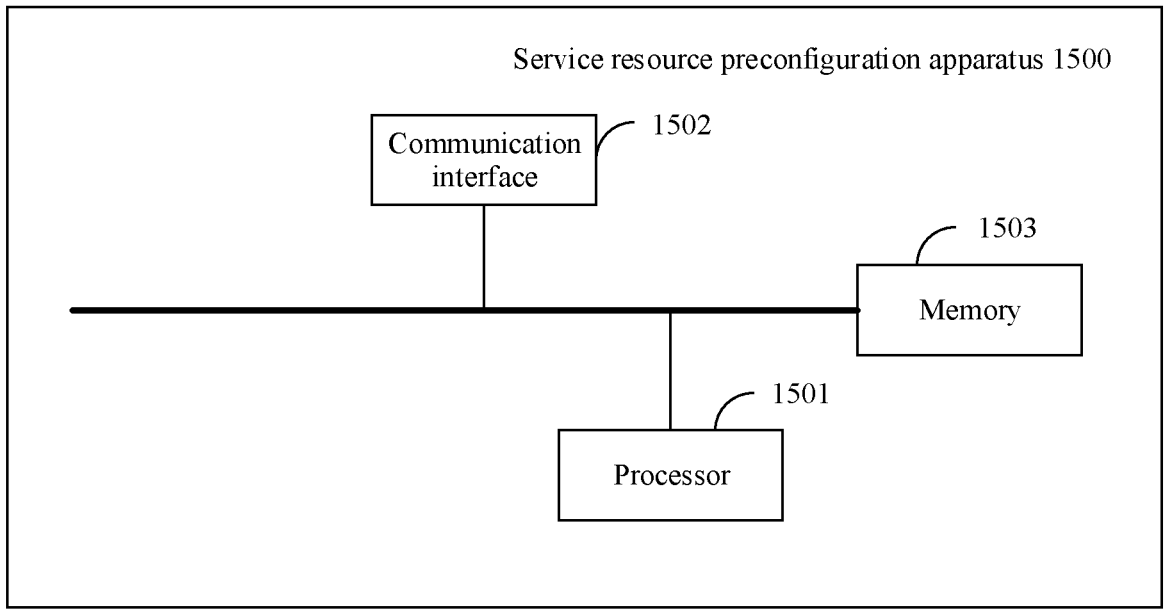
FIG. 15 is a schematic block diagram of another service resource preconfiguration apparatus 1500 according to an embodiment of this disclosure.

In another example, FIG. 15 is a schematic block diagram of another service resource preconfiguration apparatus 1500 according to an embodiment of this application. The apparatus 1500 in this embodiment of this application may be the second node in the foregoing method embodiment, and the apparatus 1500 may be configured to perform some or all functions of the second node in the foregoing method embodiment. The apparatus 1500 may include at least one processor 1501, at least one communication interface 1502, at least one memory 1503, and at least one communication bus.

The processor 1501 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication bus may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 15, but this does not mean that there is only one bus or only one type of bus. The communication bus is configured to implement connection and communication between these components. The communication interface 1502 of the second node in this embodiment of this application is configured to perform signaling or data communication with another node. The memory 1503 may include a volatile memory, for example, a nonvolatile random access memory (NVRAM), a phase change random access memory (PRAM), or a magnetoresistive random access memory (MRAM), or may include a nonvolatile memory, for example, at least one magnetic disk storage device, an electrically erasable programmable read-only memory (EEPROM), a flash memory such as a NOR flash memory or a NAND flash memory, or a semiconductor component such as a solid state drive (SSD). Optionally, the memory 1503 may be at least one storage apparatus far away from the processor 1501. The memory 1503 may be configured to store program code executed by the processor 1501. The communication interface may be an input/output interface, a pin, an input/output circuit, or the like.

The processor 1501 may be configured to control the second node, and is configured to perform the processing performed by the second node in the foregoing embodiment. The processor 1501 may perform the processing process related to the second node in the foregoing method embodiment and/or other processes of the technology described in this disclosure, and may further run an operating system.

The processor 1501 is responsible for managing a bus, and may execute a program or instructions stored in the memory. For example, the processor controls the communication interface to perform step 302 and step 303, step 402 and step 403, step 703 and step 704, or step 903 in the foregoing method embodiment.

The memory 1503 may be configured to store program code and data of the node, and the memory 1503 may be the storage module 1430 in FIG. 14.

It may be understood that the communication interface 1502 may be the transceiver module 1410 in FIG. 14. The communication interface 1502 may be further configured to support the second node in communicating with another network entity, for example, configured to support the second node in communicating with a network device (for example, a PCE).

It may be understood that FIG. 15 shows only a simplified design of the second node. For example, in actual application, the second node may include any quantities of communication interfaces, processors, memories, and the like. All second nodes that can implement the teachings of this specification fall within the protection scope of this disclosure and its accompanying claims.

An embodiment of this disclosure further provides a service resource preconfiguration apparatus. The apparatus may be a chip in the second node in the foregoing method embodiment. The chip may include the processor 1501 and the communication interface 1502 described above, or the chip may include the processor 1501 described above. The apparatus may be configured to perform some or all functions of the second node in the foregoing method embodiment. For an implementation principle and a technical effect of the apparatus, refer to the explanation in the foregoing embodiment. Details are not described herein again.

In a possible implementation, the service resource preconfiguration apparatus may be alternatively implemented by using the following: one or more field-programmable gate arrays (FPGA), a programmable logic device (PLD), a controller, a state machine, gate logic, a discrete hardware component, any other proper circuit, or any combination of circuits that can implement various functions described throughout this application. In still another example, an embodiment of this application further provides a computer storage medium. The computer storage medium may store program instructions used to indicate any one of the foregoing methods, to enable a processor to perform the program instructions to implement the method and the function that are related to the second node in the foregoing method embodiment.

Figure 16:
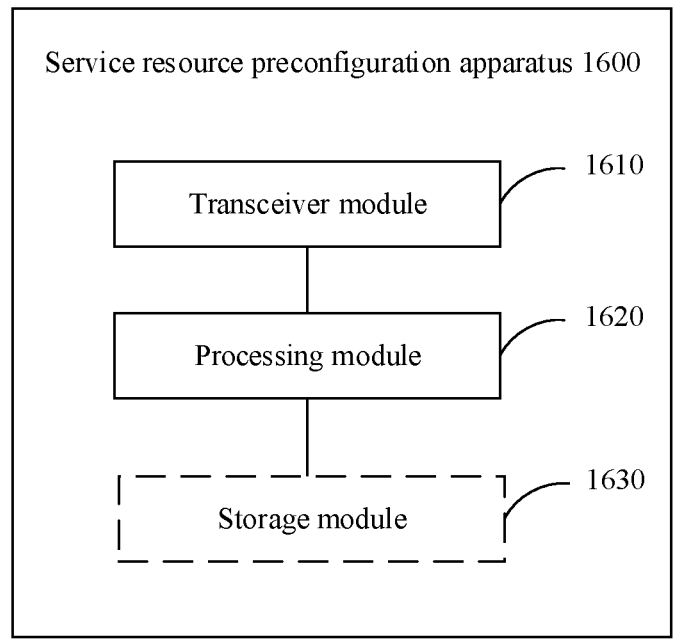
FIG. 16 is a schematic block diagram of a service resource preconfiguration apparatus 1600 according to an embodiment of this disclosure.

In an example, FIG. 16 is a schematic block diagram of a service resource preconfiguration apparatus 1600 according to an embodiment of this application. The apparatus 1600 in this embodiment may be the network device or the network slice manager in the foregoing method embodiment, or may be one or more chips in the network device or the network slice manager. When being implemented as the network device, the apparatus 1600 may be configured to perform some or all functions of the network device in the foregoing method embodiment. When being implemented as the network slice manager, the apparatus 1600 may be configured to perform some or all functions of the network slice manager in the foregoing method embodiment. The apparatus 1600 may include a transceiver module 1610 and a processing module 1620. Optionally, the apparatus 1600 may further include a storage module 1630. When the apparatus 1600 is implemented as the network device, detailed descriptions of the modules are as follows:

The processing module 1620 is configured to: after establishment of a working path is completed, determine a preset recovery path of the working path.

The processing module 1620 sends a first message to at least one node of the preset recovery path by using the transceiver module 1610, where the first message indicates the at least one node of the preset recovery path to preconfigure a channel resource. The channel resource is used for service fault recovery.

In some embodiments, the first message includes resource sharing identification information, and the resource sharing identification information indicates that the channel resource is allowed to be shared by a plurality of services.

In some embodiments, the first message includes at least one of the following information: line board identification information, port identification information, and channel resource information of the at least one node, where the line board identification information is used to configure a line board on which an optical channel data unit-k ODUk reserved by the at least one node is located, the port identification information is used to configure a port on which the optical channel data unit-k ODUk reserved by the at least one node is located, the channel resource information is used to identify the optical channel data unit-k ODUk reserved by the at least one node, and the optical channel data unit-k ODUk reserved by the at least one node is used to establish the preset recovery path.

In some embodiments, the channel resource information includes channel identification information and a slot quantity, the channel identification information indicates a channel of the optical channel data unit-k ODUk reserved by the at least one node, and the slot quantity indicates a slot quantity of the optical channel data unit-k ODUk reserved by the at least one node.

In some embodiments, the first message further includes service identification information, and the service identification information is used to configure a service on which service fault recovery is performed on the preset recovery path.

In some embodiments, the first message further includes a channel resource configuration type, and the channel resource configuration type indicates a service-level agreement SLA type supported by the optical channel data unit-k ODUk reserved by the at least one node.

In some embodiments, the first message is a message that is based on a path computation element communication protocol PCEP.

It should be noted that, for implementation of the modules, refer to the corresponding descriptions in the method embodiment shown in FIG. 5 or FIG. 10, to perform the method and the function that are performed in the foregoing embodiment.

When the apparatus 1600 is implemented as the network slice manager, detailed descriptions of the modules are as follows:

The processing module 1620 separately sends first messages to a plurality of nodes of a network slice by using the transceiver module 1610, where the first messages indicate the nodes of the network slice to preconfigure channel resources. The channel resources are used to establish a service path.

In some embodiments, the first message includes resource sharing identification information, and the resource sharing identification information indicates that the channel resource is allowed to be shared by a plurality of services.

In some embodiments, the first message includes at least one of the following information: line board identification information, port identification information, and channel resource information of the node, where the line board identification information is used to configure a line board on which an optical channel data unit-k ODUk reserved by the node is located, the port identification information is used to configure a port on which the optical channel data unit-k ODUk reserved by the node is located, the channel resource information is used to identify the optical channel data unit-k ODUk reserved by the node, and the optical channel data unit-k ODUk reserved by the node is used to establish the service path.

In some embodiments, the channel resource information includes channel identification information and a slot quantity, the channel identification information indicates a channel of the optical channel data unit-k ODUk reserved by the node, and the slot quantity indicates a slot quantity of the optical channel data unit-k ODUk reserved by the node.

In some embodiments, the first message further includes a channel resource configuration type, and the channel resource configuration type indicates a service-level agreement SLA type supported by the optical channel data unit-k ODUk reserved by the node.

In some embodiments, the first message is a network slice establishment message or a network slice update message.

It should be noted that, for implementation of the modules, refer to the corresponding descriptions in the method embodiment shown in FIG. 6 or FIG. 11, to perform the method and the function that are performed in the foregoing embodiment.

Alternatively, the apparatus 1600 may be configured as a general processing system, commonly known as, for example, a chip. The processing module 1620 may include one or more processors that provide a processing function. The transceiver module 1610 may be, for example, an input/output interface, a pin, or a circuit. The input/output interface may be configured to be responsible for information exchange between the chip system and the outside. For example, the input/output interface may output a message of the network device or the network slice manager to another module outside the chip for processing. The processing module may execute computer-executable instructions stored in the storage module, to implement the function of the network device or the network slice manager in the foregoing method embodiment. In an example, the storage module 1630 optionally included in the apparatus 1600 may be a storage unit inside the chip, for example, a register or a cache, or the storage module 1630 may be a storage unit that is outside the chip and that is inside the network device or the network slice manager, for example, a read-only memory (ROM), another type of static storage device that can store static information and instructions, or a random access memory (RAM).

Figure 17:
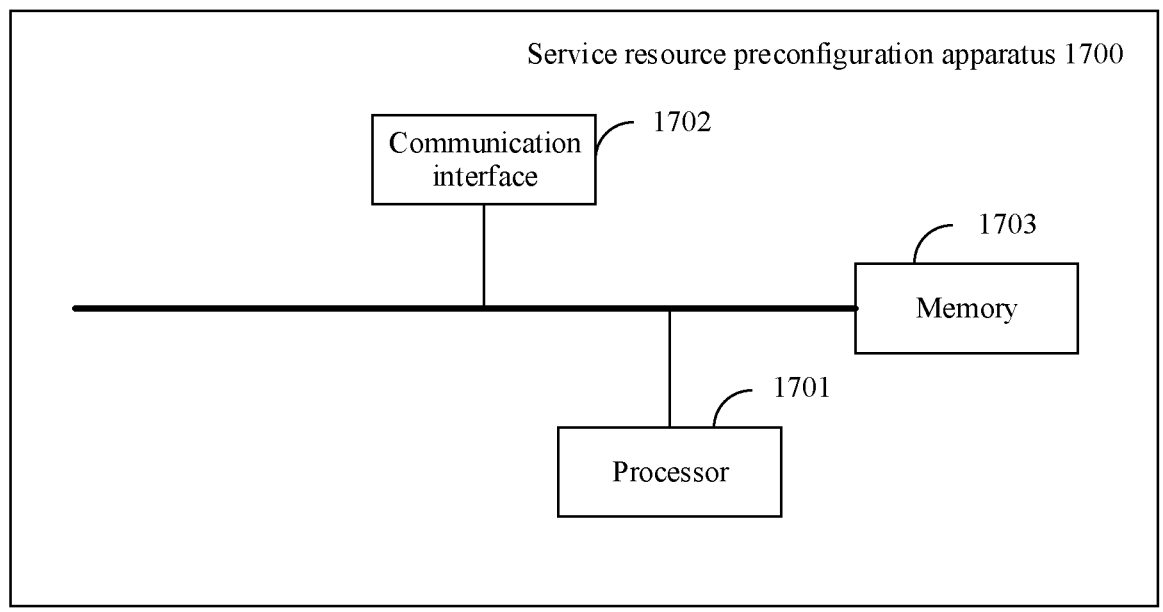
FIG. 17 is a schematic block diagram of another service resource preconfiguration apparatus 1700 according to an embodiment of this disclosure.

In another example, FIG. 17 is a schematic block diagram of another service resource preconfiguration apparatus 1700 according to an embodiment of this application. The apparatus 1700 in this embodiment of this application may be the network device or the network slice manager in the foregoing method embodiment, and the apparatus 1700 may be configured to perform some or all functions of the network device or the network slice manager in the foregoing method embodiment. The apparatus 1700 may include at least one processor 1701, at least one communication interface 1702, at least one memory 1703, and at least one communication bus.

The processor 1701 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this specification. Alternatively, the processor may be a combination of processors implementing a computing function, for example, a combination of one or more microprocessors, or a combination of the digital signal processor and a microprocessor. The communication bus may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 17, but this does not mean that there is only one bus or only one type of bus. The communication bus is configured to implement connection and communication between these components. The communication interface 1702 of the network device or the network slice manager in this embodiment of this application is configured to perform signaling or data communication with another node. The memory 1703 may include a volatile memory, for example, a nonvolatile random access memory (NVRAM), a phase change random access memory (PRAM), or a magnetoresistive random access memory (MRAM), or may include a nonvolatile memory, for example, at least one magnetic disk storage device, an electrically erasable programmable read-only memory (EEPROM), a flash memory such as a NOR flash memory or a NAND flash memory, or a semiconductor component such as a solid state drive (SSD). Optionally, the memory 1703 may be at least one storage apparatus far away from the processor 1701. The memory 1703 may be configured to store program code executed by the processor 1701. The communication interface may be an input/output interface, a pin, an input/output circuit, or the like.

The processor 1701 may be configured to control the network device or the network slice manager, and is configured to perform the processing performed by the network device or the network slice manager in the foregoing embodiment. The processor 1701 may perform the processing process related to the network device or the network slice manager in the foregoing method embodiment and/or other processes of the technology described in this application, and may further run an operating system. The processor 1701 is responsible for managing a bus, and may execute a program or instructions stored in the memory. For example, when the apparatus 1700 is implemented as the network device, the processor controls the communication interface to perform step 501 and step 502, or step 1001, step 1002, step 1004, and step 1006 in the foregoing method embodiment. For example, when the apparatus 1700 is implemented as the network slice manager, the processor controls the communication interface to perform step 601, or step 1101 and step 1102 in the foregoing method embodiment.

The memory 1703 may be configured to store program code and data of the network device or the network slice manager, and the memory 1703 may be the storage module 1630 in FIG. 16.

It may be understood that the communication interface 1702 may be the transceiver module 1610 in FIG. 16. The communication interface 1702 may be further configured to support the network device or the network slice manager in communicating with another network entity.

It may be understood that FIG. 17 shows only a simplified design of the network device or the network slice manager. For example, in actual application, the network device or the network slice manager may include any quantities of communication interfaces, processors, memories, and the like. All network devices or network slice managers that can implement the teachings of this specification fall within the protection scope of this disclosure and the accompanying claims.

An embodiment of this disclosure further provides a service resource preconfiguration apparatus. The apparatus may be a chip in the network device or the network slice manager in the foregoing method embodiment. The chip may include the processor 1701 and the communication interface 1702 described above, or the chip may include the processor 1701 described above. The apparatus may be configured to perform some or all functions of the network device or the network slice manager in the foregoing method embodiment. For an implementation principle and a technical effect of the network device or the network slice manager, refer to the explanation in the foregoing embodiment. Details are not described herein again.

In a possible implementation, the service resource preconfiguration apparatus may be alternatively implemented by using the following: one or more field-programmable gate arrays (FPGA), a programmable logic device (PLD), a controller, a state machine, gate logic, a discrete hardware component, any other proper circuit, or any combination of circuits that can implement various functions described throughout this application. In still another example, an embodiment of this application further provides a computer storage medium. The computer storage medium may store program instructions used to indicate any one of the foregoing methods, to enable a processor to perform the program instructions to implement the method and the function that are related to the network device or the network slice manager in the foregoing method embodiment.

An embodiment further provides a communication system. The communication system includes a first node and a second node. The first node may use the structure of any one of the apparatus embodiments shown in FIG. 12 and FIG. 13. The second node may use the structure of any one of the apparatus embodiments shown in FIG. 14 and FIG. 15. Correspondingly, the communication system may perform the technical solution of any one of the method embodiments shown in FIG. 3, FIG. 4, and FIG. 7. An implementation principle and a technical effect of the communication system are similar, and details are not described herein.

The foregoing descriptions about implementations allow a person skilled in the art to understand that, for convenient and brief description, division into the foregoing functional modules is taken as an example for illustration. In actual application, the foregoing functions can be allocated to different modules and implemented based on a requirement, in other words, an inner structure of an apparatus is divided into different functional modules to implement all or some of the functions described above.

In the several embodiments provided in this specification, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the current technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

The terms such as "first" and "second" in the embodiments of this disclosure are only used for distinguishing description, but are not to be interpreted as an indication or implication of relative importance or an indication or implication of a sequence. In addition, the terms "include", "have", and any other variant thereof are intended to cover a non-exclusive inclusion. For example, a method, system, product, or device that includes a series of steps or units is not necessarily limited to those expressly listed steps or units, but may include other steps or units not expressly listed or inherent to such a method, system, product, or device.

It should be understood that, in this disclosure, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between associated objects. "At least one of the following items (pieces)" or a similar expression thereof indicates any combination of these items, including any combination of single items (pieces) or a plurality of items (pieces). For example, at least one of a, b, or c may indicate a, b, c, a and b, a and c, b and c, or a, b, and c, where a, b, and c may be singular or plural.

What is claimed is:

1. An apparatus that is a node in a communication system or a chip in the node, the apparatus comprising:
one or more processors; and
a memory, configured to store one or more programs that, when executed by the one or more processors, enable the node to perform operations comprising:
receiving a message including channel resource configuration information of the node after a first working path for a service flow is established,
wherein the channel resource configuration information of the node includes an instruction to preconfigure a first channel resource for a preset recovery path of the first working path, the first working path and the preset recovery path include the node, and the message is a first path message sent by a second node included in the preset recovery path or a first message sent by a manage and control node in the communication system,
wherein the channel resource configuration information of the node comprises at least one of the following information:
line board identification information to configure a line board on which is located the first ODUk reserved by the node;
port identification information to configure a port on which is located the first ODUk reserved by the node; and
channel resource information of the node to identify the first ODUk reserved by the node, the first ODUk reserved by the node being configured to establish the preset recovery path;
preconfiguring the first channel resource based on the message, wherein the first channel resource is a first optical channel data unit-k (ODUk) reserved by the node and configured to switch the service flow from the working path to the preset recovery path after the first working path is faulty, k corresponds to a rate level.

2. The apparatus according to claim 1, the message further comprising service identification information to configure a service on which fault recovery is performed on the preset recovery path.

3. The apparatus according to claim 1, the message further comprising a channel resource configuration type indicating a service-level agreement (SLA) type supported by the first ODUk reserved by the node.

4. The apparatus according to claim 1, the message comprising resource sharing identification information indicating that the channel resource is allowed to be shared by a plurality of services or shared in the communication system.

5. The apparatus according to claim 1, the channel resource information of the node comprising channel identification information and a slot quantity, the channel identification information indicating a channel of the first ODUk reserved by the node, and the slot quantity indicating a slot quantity of the first ODUk reserved by the node.

6. The apparatus according to claim 1, wherein the first path message further comprises channel resource configuration information of a third node included in the preset recovery path, and the channel resource configuration information includes an instruction for the third node to preconfigure a second channel resource that is a second ODUk reserved by the third node; and
wherein the operations further comprise:
sending a second path message to the third node, the second path message carrying the channel resource configuration information of the third node.

7. The apparatus according to claim 1, wherein the first message further comprises channel resource configuration information of at least one of the second node included in the preset recovery path or a third node included in the preset recovery path.

8. A method performed by a node in a communication system or a chip in the node, the method comprising:
receiving a message including channel resource configuration information of the node after a first working path for a service flow is established,
wherein the channel resource configuration information of the node includes an instruction to preconfigure a first channel resource for a preset recovery path of the first working path, the first working path and the preset recovery path include the node, and the message is a first path message sent by a second node included in the preset recovery path or a first message sent by a a manage and control node in the communication system,
wherein the channel resource configuration information of the node comprises at least one of the following information:
line board identification information to configure a line board on which is located the first ODUk reserved by the node;
port identification information to configure a port on which is located the first ODUk reserved by the node; and
channel resource information of the node to identify the first ODUk reserved by the node, the first ODUk reserved by the node being configured to establish the preset recovery path;
preconfiguring the first channel resource based on the message, wherein the first channel resource is a first optical channel data unit-k (ODUk) reserved by the node and configured to switch the service flow from the working path to the preset recovery path after the first working path is faulty, k corresponds to a rate level.

9. The method according to claim 8, the channel resource information of the node comprising channel identification information and a slot quantity, the channel identification information indicating a channel of the first ODUk reserved by the node, and the slot quantity indicating a slot quantity of the first ODUk reserved by the node.

10. The method according to claim 8, the message further comprising service identification information to configure a service on which fault recovery is performed on the preset recovery path.

11. The method according to claim 8, the message further comprising a channel resource configuration type indicating a service-level agreement (SLA) type supported by the first ODUk reserved by the node.

12. The method according to claim 8, the message comprising resource sharing identification information indicating that the channel resource is allowed to be shared by a plurality of services or shared in the communication system.

13. The method according to claim 8, wherein the first path message further comprises channel resource configuration information of a third node included in the preset recovery path, and the channel resource configuration information includes an instruction for the third node to preconfigure a second channel resource that is a second ODUk reserved by the third node; and
wherein the method further comprises:
sending a second path message to the third node, the second path message carrying the channel resource configuration information of the third node.

14. The method according to claim 8, wherein the first message further comprises channel resource configuration information of at least one of the second node included in the preset recovery path or a third node included in the preset recovery path.

15. A non-transitory computer-readable storage medium, comprising a computer program for execution by a processor of a node in a communication system, the computer program comprising instructions for:
receiving a message including channel resource configuration information of the node after a first working path for a service flow is established,
wherein the channel resource configuration information of the node includes an instruction to preconfigure a first channel resource for a preset recovery path of the first working path, the first working path and the preset recovery path include the node, and the message is a first path message sent by a second node included in the preset recovery path or a first message sent by a manage and control node in the communication system,
wherein the channel resource configuration information of the node comprises at least one of the following information:
line board identification information to configure a line board on which is located the first ODUk reserved by the node;
port identification information to configure a port on which is located the first ODUk reserved by the node; and
channel resource information of the node to identify the first ODUk reserved by the node, the first ODUk reserved by the node being configured to establish the preset recovery path;
preconfiguring the first channel resource based on the message, wherein the first channel resource is a first optical channel data unit-k (ODUk) reserved by the node and configured to switch the service flow from the working path to the preset recovery path after the first working path is faulty, k corresponds to a rate level.

16. The non-transitory computer-readable storage medium according to claim 15, the channel resource information of the node comprising channel identification information and a slot quantity, the channel identification information indicating a channel of the first ODUk reserved by the node, and the slot quantity indicating a slot quantity of the first ODUk reserved by the node.

17. The non-transitory computer-readable storage medium according to claim 15, the message further comprising service identification information to configure a service on which fault recovery is performed on the preset recovery path.

18. The non-transitory computer-readable storage medium according to claim 15, the message further comprising a channel resource configuration type indicating a service-level agreement (SLA) type supported by the first ODUk reserved by the node, or resource sharing identification information indicating that the channel resource is allowed to be shared by a plurality of services or shared in the communication system.

19. The non-transitory computer-readable storage medium according to claim 15, wherein the first path message further comprises channel resource configuration information of a third node included in the preset recovery path, and the channel resource configuration information includes an instruction for the third node to preconfigure a second channel resource that is a second ODUk reserved by the third node; and
wherein the computer program further comprises instructions for:

sending a second path message to the third node, the second path message carrying the channel resource configuration information of the third node.

20. The non-transitory computer-readable storage medium according to claim 15, wherein the first message further comprises channel resource configuration information of at least one of the second node included in the preset recovery path or a third node included in the preset recovery path.

21. A communication system, comprising a first node and a second node, wherein
the first node is configured to send a message to the second node, wherein the message includes channel resource configuration information of the second node after a first working path for a service flow is established,
wherein the channel resource configuration information of the node includes an instruction to preconfigure a first channel resource for a preset recovery path of the first working path, the first working path and the preset recovery path include the second node, and the first node is a node included in the preset recovery path or a manage and control node in the communication system,
wherein the channel resource configuration information of the second node comprises at least one of the following information:
line board identification information to configure a line board on which is located the first ODUk reserved by the second node;
port identification information to configure a port on which is located the first ODUk reserved by the second node; and
channel resource information of the second node to identify the first ODUk reserved by the second node, the first ODUk reserved by the second node being configured to establish the preset recovery path; and
the second node is configured to receive the message and preconfigure the first channel resource based on the message, wherein the first channel resource is a first optical channel data unit-k (ODUk) reserved by the node and configured to switch the service flow from the working path to the preset recovery path after the first working path is faulty, k corresponds to a rate level.

22. The communication system according to claim 21, the channel resource information of the node comprising channel identification information and a slot quantity, the channel identification information indicating a channel of the first ODUk reserved by the second node, and the slot quantity indicating a slot quantity of the first ODUk reserved by the second node.

23. The communication system according to claim 21, he message further comprising service identification information to configure a service on which fault recovery is performed on the preset recovery path.

24. The communication system according to claim 21, the message further comprising a channel resource configuration type indicating a service-level agreement (SLA) type supported by the first ODUk reserved by the second node, or resource sharing identification information indicating that the channel resource is allowed to be shared by a plurality of services or shared in the communication system.

25. The communication system according to claim 21, wherein the first path message further comprises channel resource configuration information of a third node included in the preset recovery path, and the channel resource configuration information includes an instruction for the third node to preconfigure a second channel resource that is a second ODUk reserved by the third node; and
wherein the second node is further configured to:
send a second path message to the third node, the second path message carrying the channel resource configuration information of the third node.

26. The communication system according to claim 21, wherein the first message further comprises channel resource configuration information of at least one of the second node included in the preset recovery path or a third node included in the preset recovery path.

* * * * *